(12) United States Patent
Eckert et al.

(10) Patent No.: US 7,839,892 B2
(45) Date of Patent: Nov. 23, 2010

(54) DATA LINK LAYER PROTOCOL UNIT

(75) Inventors: Michael Eckert, Braunschweig (DE);
Hyung-Nam Choi, Hamburg (DE);
Martin Wuschke, Meine (DE)

(73) Assignee: Infineon Technologies AG, Neubiberg (DE)

( * ) Notice: Subject to any disclaimer, the term of this patent is extended or adjusted under 35 U.S.C. 154(b) by 1456 days.

(21) Appl. No.: 11/238,645

(22) Filed: Sep. 28, 2005

(65) Prior Publication Data

US 2006/0088058 A1    Apr. 27, 2006

(30) Foreign Application Priority Data

Sep. 29, 2004   (DE) .................. 10 2004 047 349

(51) Int. Cl.
*H04J 3/04* (2006.01)
(52) U.S. Cl. .................. 370/469; 370/466
(58) Field of Classification Search ........ 370/254, 370/466, 469
See application file for complete search history.

(56) References Cited

U.S. PATENT DOCUMENTS

| | | | | |
|---|---|---|---|---|
| 6,510,137 | B1 * | 1/2003 | Belaiche | 370/232 |
| 6,636,497 | B1 * | 10/2003 | Honkasalo et al. | 370/335 |
| 6,731,623 | B2 * | 5/2004 | Lee et al. | 370/349 |
| 6,807,192 | B2 * | 10/2004 | Terry | 370/469 |
| 6,850,540 | B1 * | 2/2005 | Peisa et al. | 370/468 |
| 6,909,887 | B2 * | 6/2005 | Fauconnier et al. | 455/403 |
| 6,944,178 | B1 * | 9/2005 | Charriere et al. | 370/444 |
| 6,999,432 | B2 * | 2/2006 | Zhang et al. | 370/328 |
| 7,050,415 | B2 * | 5/2006 | Herrmann et al. | 370/338 |
| 7,054,381 | B2 * | 5/2006 | Lim et al. | 375/295 |
| 7,130,295 | B2 * | 10/2006 | Kim et al. | 370/349 |
| 7,187,708 | B1 * | 3/2007 | Shiu et al. | 375/148 |
| 7,200,135 | B2 * | 4/2007 | Choi et al. | 370/348 |
| 7,239,870 | B2 * | 7/2007 | Zhang et al. | 455/422.1 |
| 7,333,443 | B2 * | 2/2008 | Beckmann et al. | 370/254 |
| 7,388,848 | B2 * | 6/2008 | Virtanen et al. | 370/329 |
| 2002/0001296 | A1 * | 1/2002 | Lee et al. | 370/338 |
| 2002/0097695 | A1 * | 7/2002 | Herrmann | 370/329 |
| 2003/0007480 | A1 | 1/2003 | Kim et al. | |
| 2003/0039236 | A1 * | 2/2003 | Uga | 370/345 |
| 2003/0131124 | A1 * | 7/2003 | Yi et al. | 709/236 |

(Continued)

FOREIGN PATENT DOCUMENTS

DE    10 2004 044 965 A1    3/2006

(Continued)

OTHER PUBLICATIONS

3GPP TS 25.331 Version 6.3.0 Section 8.6.5 (Sep. 2004).

(Continued)

*Primary Examiner*—Ricky Ngo
*Assistant Examiner*—Ben H Liu
(74) *Attorney, Agent, or Firm*—Dickstein Shapiro LLP

(57) ABSTRACT

Each transport format contains control parameters according to which data are mapped from at least one logical channel onto at least one transport channel by a data link layer protocol unit, with the control parameters in the transport formats containing information regarding that or those data link layer protocol buffer storages and/or that or those data link layer data streams from which the data to be transmitted need to be transmitted in a data transmission time interval.

26 Claims, 5 Drawing Sheets

U.S. PATENT DOCUMENTS

| | | | |
|---|---|---|---|
| 2003/0210660 A1* | 11/2003 | Wiberg et al. | 370/320 |
| 2004/0028078 A1* | 2/2004 | Beckmann et al. | 370/469 |
| 2004/0083300 A1* | 4/2004 | Toda | 709/230 |
| 2004/0228313 A1* | 11/2004 | Cheng et al. | 370/342 |
| 2004/0268351 A1* | 12/2004 | Mogensen et al. | 718/100 |
| 2005/0053035 A1* | 3/2005 | Kwak et al. | 370/331 |
| 2005/0076283 A1* | 4/2005 | Malkamaki et al. | 714/748 |
| 2005/0105499 A1* | 5/2005 | Shinozaki et al. | 370/338 |
| 2006/0088058 A1* | 4/2006 | Eckert et al. | 370/469 |
| 2006/0140158 A1* | 6/2006 | Terry | 370/335 |

FOREIGN PATENT DOCUMENTS

| | | |
|---|---|---|
| EP | 1 341 336 A1 | 9/2003 |
| WO | WO-03/071740 A1 | 8/2003 |

OTHER PUBLICATIONS

3GPP TS 25.322 V6.1.0 (Jun. 2004); Technical Specification; 3rd Generation Partnership Project; Technical Specification Group Radio Access Network; Radio Link Control (RLC) protocol specification (Release 6).

3GPP TS 25.321 Version 6.2.0 Section 11.4 (Jun. 2004).

3GPP TS 25.302 Version 5.7.0 Section 7.1 (Dec. 2003).

ARIB STD-T63-25.301 V3.10.0; 3GPP TS 25.301 V3.10.0 (Jun. 2002) Technical Specification; 3rd Generation Partnership Project; Technical Specification Group Radio Access Network; Radio Interface Protocol Architecture (Release 1999).

ARIB STD-T63-25.321 V3.17.0; 3GPP TS 25.321 V3.17.0 (Jun. 2004) Technical Specification; 3rd Generation Partnership Project; Technical Specification Group Radio Access Network; Medium Access Control (MAC) protocol specification(Release 1999).

TS 25.331 V3.0.0 (Oct. 1999) Technical Specification; 3rd Generation Partnership Project (3GPP); Technical Specification Group (TSG) RAN; Working Group 2 (WG2); RRC Protocol Specification.

RP-040081, "Proposed Work Item on FDD Enhanced Uplink"; TSG-RAN Meeting #23, Phoenix, Arizona, USA, Mar. 10-12, 2004.

* cited by examiner

FIG 5

| Information Element/ Group name | Need | Multi | Type and reference | Semantics description |
|---|---|---|---|---|
| Priority Queue | OP | 1 to <maxPQ> | | |
| >PQ Identity | MP | | PQ Identity | |
| >Choice PQ weighting | | | | |
| >>explicit PQ weighting | OP | | Integer (0...100) | Value in % |
| >>PQ weighting band | OP | | | |
| >>>lower PQ border | OP | | Integer (0...100) | Value in % |
| >>>upper PQ border | OP | | Integer (0...100) | Value in % |

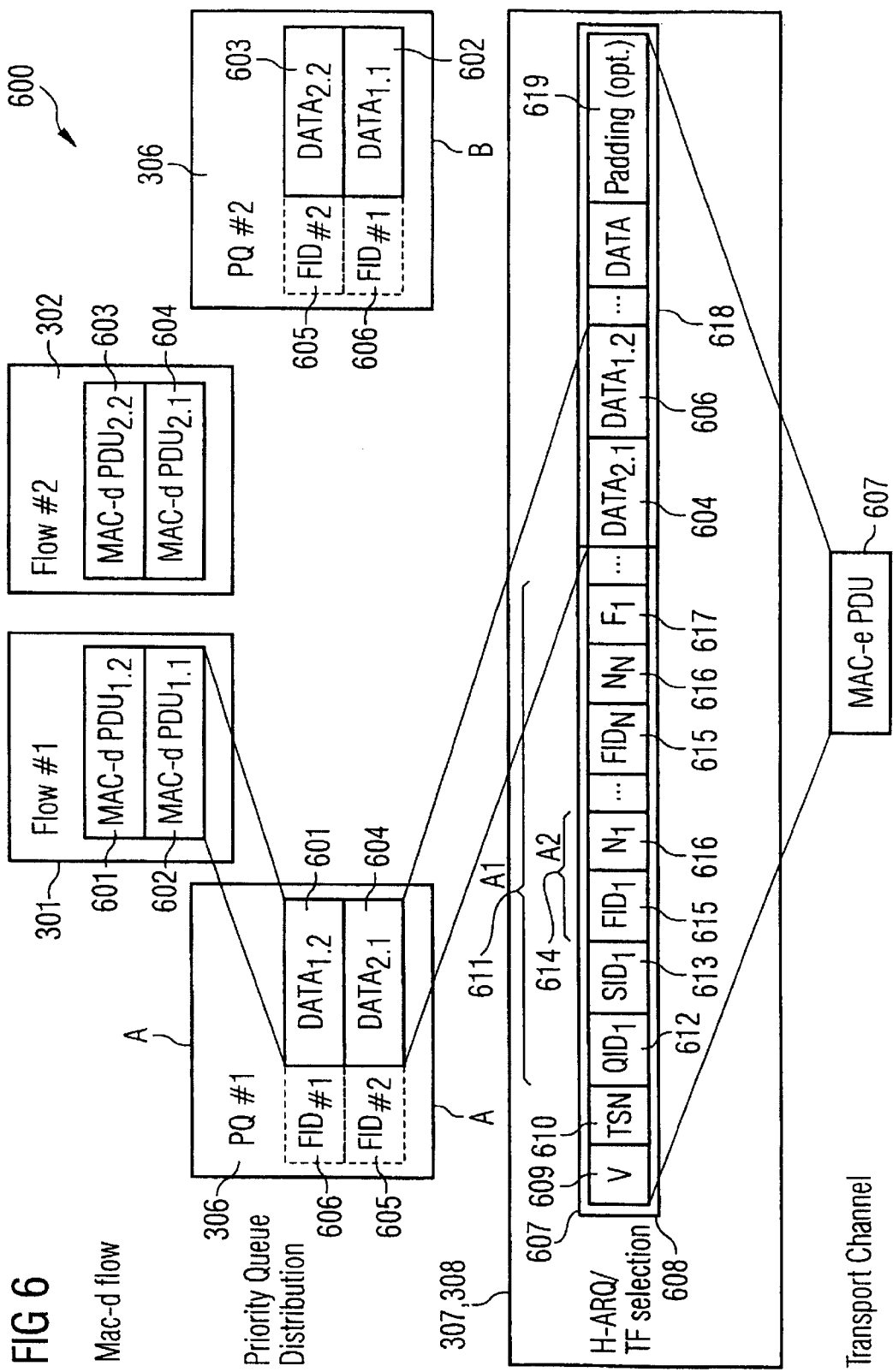

DATA LINK LAYER PROTOCOL UNIT

CROSS-REFERENCE TO RELATED APPLICATION

This application claims priority to German Patent Application Serial No. 10 2004 047 349.8, which was filed on Sep. 29, 2005.

FIELD OF THE INVENTION

The invention relates to a data link layer protocol unit, mobile radio devices, a mobile radio network control unit and also a method for reading data from a plurality of data link layer protocol buffer storages.

BACKGROUND OF THE INVENTION

Such a mobile radio device, such a mobile radio network control unit and such a method are known within the context of the mobile radio system UMTS (Universal Mobile Telecommunications System).

A UMTS mobile radio system normally has a core network (CN), a mobile radio access network (UMTS Terrestrial Radio Access Network, UTRAN) and also a large number of mobile radio terminals (User Equipment, UE). In UMTS, a transmission mode is provided, called FDD (Frequency Division Duplex) mode, which involves separate signal transmission taking place in the uplink direction (uplink direction denotes a signal transmission direction from a mobile radio terminal to a respective base station in the mobile radio access network) and in the downlink direction (downlink direction denotes a signal transmission direction from a respective base station associated with the mobile radio terminal in the mobile radio access network to the mobile radio terminal) through separate allocation of frequencies or frequency ranges.

For the purpose of transmitting data between a mobile radio terminal and a respective base station in a mobile radio cell, UMTS defines an air interface which is divided into three protocol layers. An overview and a detailed description of the air interface protocol layers based on UMTS can be found in 3GPP TS 25.301, Technical Specification, Third Generation Partnership Project; Technical Specification Group Radio Access Network; Radio Interface Protocol Architecture (Release 1999).

One of the three protocol layers of the UMTS air interface is known as the Radio Resource Control (RRC) protocol layer. The RRC protocol or the RRC protocol layer is responsible for setting up and clearing down and also for (re)configuring physical channels, transport channels, logical channels, signalling radio bearers and radio bearers, and also for negotiating all parameters of the protocol layers of layer 1 and layer 2 on the basis of UMTS. To this end, the units of the RRC layer in the mobile radio terminal and in the mobile radio network control unit use the signalling radio bearers to interchange appropriate RRC messages, as described in 3GPP TS 25.331, Technical Specification, Third Generation Partnership Project; Technical Specification Group Radio Access Network; RRC Protocol Specification (Release 1999).

For the purpose of management, generally the management of mobile radio transmission resources in the mobile radio terminal within the context of the uplink packet data transmission, it is known that the mobile radio terminal communicates information about the volume of data traffic in a transport channel to a mobile radio network control unit (Radio Network Controller, RNC) at the level of the RRC protocol layer. This is done using "measurement report messages". In this connection, as table 1 below shows, data buffer storage filling levels, i.e. the filling level of the data buffer storages in the RLC units, for the transport channel in question are indicated to the currently competent mobile radio network control unit. In other words, this means that in line with 3GPP TS 25.331, Technical Specification, Third Generation Partnership Project; Technical Specification Group Radio Access Network; RRC Protocol Specification (Release 1999) the mobile radio network control unit is sent notification at the RRC layer level regarding how many data items to be transmitted there are at present in the buffer storages in the RLC units of the respective mobile radio terminal.

In this connection, mobile radio transmission resources are to be understood, in particular, to mean the transmission power of the mobile radio terminal, the number and also the spreading factor of the allocated CDMA codes.

Table 1 shows an example of such a measurement report list, as described in 3GPP TS 25.331, Technical Specification, Third Generation Partnership Project; Technical Specification Group Radio Access Network; RRC Protocol Specification (Release 1999):

TABLE 1

| Information Element/Group name | Need | Multi | Type and reference | Semantics description |
| --- | --- | --- | --- | --- |
| Traffic volume measurement results | OP | 1 to <maxRB> | | |
| >RB Identity | MP | | RB Identity 10.3.4.1 6 | |
| >RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N*1024 bytes. Twelve spare values are needed. |
| >Average of RLC Buffer Payload | OP | | Enumerated (0, 4, 8, 16, 32, 64, 128, 256, 512, 1024, 2K, 4K, 8K, 16K, 32K, 64K, 128K, 256K, 512K, 1024K) | In bytes And N Kbytes = N*1024 bytes. Twelve spare values are needed. |
| >Variance of RLC Buffer Payload | OP | | Enumerated (0, 4, 8, 16, 32, 64, 128, 256, 512, 1024, 2K, 4K, 8K, 16K) | In bytes And N Kbytes = N*1024 bytes. Two spare values are needed. |

Using this information, the mobile radio network control unit can configure the mobile radio terminal as appropriate, for example in order to restrict or expand the usable transport formats of a mobile radio terminal or to perform handover to another mobile radio cell, reconfiguration of the dedicated physical channels or an RRC state change, particularly from a first RRC state CELL_DCH to a second RRC state CELL_FACH.

The measurement result list shown in Table 1 is thus transmitted from an RRC unit in the mobile radio terminal to the RRC unit in the corresponding mobile radio network control unit, and the respective RRC data buffer storage filling level is indicated for each radio bearer (RB).

The standardization committee 3GPP (3rd Generation Partnership Project) is currently, as described in RP 040081, Proposed Work Item on FDD Enhanced Uplink, TSG RAN Meeting #23, Phoenix, USA, Mar. 10 12 2004, working on improving the packet data transmission via dedicated transport channels in the uplink, i.e. for the uplink direction at the UMTS air interface for the FDD mode, with a view to increasing the data throughput and the transmission speed. To achieve better differentiation from the already existing dedicated transport channel DCH, a new dedicated transport channel called Enhanced Dedicated Channel (E-DCH) has been introduced for this purpose. The fundamental characteristics of this new transport channel include the application of a Hybrid Automatic Repeat Request method (HARQ method) based on the N-channel stop&wait method, scheduling controlled by the base station, also called NodeB in UMTS, and also frame lengths of less than or equal to 10 ms.

The N-channel stop&wait HARQ method is a transmission protection method in which a mobile radio terminal has a number of N "HARQ processes" configured for it, with an HARQ process representing a respective instance of the stop&wait method. For each HARQ process, the data are transmitted to the network and are buffer-stored until the network receives acknowledgement of correctly received data (Acknowledgement, ACK). Otherwise, i.e. if the data have not been received correctly (Negative Acknowledgement, NACK), the data are transmitted to the network again.

The NodeB controlled scheduling is a method in which the scheduling in the mobile radio terminal, i.e. the selection of an appropriate transport format from a set of defined transport formats for the E-DCH transport channel, is controlled such that the nodeB can temporarily restrict or expand a mobile radio terminal's use of transport formats from the set of defined transport formats for the E-DCH transport channel on the basis of the traffic situation in the respective radio cell.

To date, however, a decision has not yet been made regarding the details of how the data about the new transport channel E-DCH are to be transmitted via the UMTS air interface. One possible solution is to split the data according to their priorities over various data buffer storages, known as Priority Queues (PQ), which are then processed and hence transmitted with preference or with less preference according to their importance, i.e. their priority.

As set out above, a transmission protection method (HARQ method) is applied in which the network sends the mobile radio terminal an acknowledgement about correctly or incorrectly received data. The mobile radio terminal contains various data buffer storages for this function too, in order to buffer-store the data prior to acknowledgement of correct receipt.

Both functions are performed within the MAC protocol layer in the newly provided subprotocol layer, i.e. what is known as a Medium Access Control Enhanced Uplink (MAC-e) entity, which is present, i.e. implemented, both on the terminal and on the network. On the network, the entity executing the communication protocol based on MAC-e can be found in the NodeB, i.e. in the UMTS base station.

In addition, UMTS communication standard release 5 for the downlink (downlink transmission direction) contains a method, called High Speed Downlink Packet Access (HSDPA), for improving the air interface for the packet data transmission via the shared transport channel High Speed Downlink Shared CHannel (HS-DSCH). In comparable fashion to the enhanced uplink medium access control protocol, the fundamental characteristics of the HSDPA method are based on the application of an N-channel stop&wait HARQ method, NodeB controlled scheduling and frame lengths of less than 2 ms. These functions are performed in the medium access control subprotocol layer MAC-hs (Medium Access Control High Speed), with the units which implement the MAC-hs protocol being provided both on the terminal and on the network, in this case usually in a mobile radio base station.

The MAC-hs subprotocol layer receives the data which are to be processed in the downlink transmission direction, i.e. the protocol data units which are processed in the MAC-hs subprotocol layer, from the MAC-d subprotocol layer using "MAC-d flows" in the form of MAC-d protocol data units, which correspond to the MAC-hs service data units (SDU). The protocol data units formed by the MAC-hs subprotocol layer, i.e. the "MAC-hs PDUs", are transmitted via the transport channel called HS-DSCH to the physical transmission layer, which then uses the air interface to transmit them via the physical channel HS-PDSCH (High Speed Physical Downlink Shared Channel) to a subscriber terminal.

An MAC-hs protocol data unit comprises an MAC-hs header field (header) and one or more MAC-hs SDUs. In each transmission time interval (TTI) of 2 ms, it is possible to transmit a maximum of one MAC-hs PDU. The MAC-hs control data header, i.e. the header field of the MAC-hs PDU, has a variable length. In the MAC-hs subprotocol layer, the data to be transmitted are buffer-stored in data buffer storages, known as Priority Queues (PQ), according to their priority. In line with the MAC-hs subprotocol, as described in 3GPP TS 25.321, Technical Specification, Third Generation Partnership Project; Technical Specification Group Radio Access Network; Medium Access Control (MAC) Protocol Specification, all the MAC-hs SDUs in a transmission time interval belong to the same priority queue, i.e. in each transmission time interval only MAC-hs SDUs having the same priority are transmitted on an HS-DSCH transport channel.

In line with the HSDPA method, a "Transport Format Resource Indicator" (TFRI) is provided which is transmitted to the individual subscriber terminals in a respective mobile radio cell via the physical channel called High Speed Shared Control CHannel (HS-SCCH). Using the Transport Format Resource Indicator, the respective subscriber terminal can derive the respective sizes of the transport blocks of an MAC-hs PDU in line with 3GPP TS 25.321, Technical Specification, Third Generation Partnership Project; Technical Specification Group Radio Access Network; Medium Access Control (MAC) Protocol Specification. Signals are thus sent to indicate the size of the respective MAC-hs PDU which is being transmitted on the associated HS-PDSCH.

In line with the HSDPA method, in each data transmission time interval the data from just one priority queue are transmitted via the HS-DSCH, which is why the control data header of an MAC-hs protocol data unit has a very simple structure and it is necessary to transmit only the information regarding the priority queue from which the data to be transmitted originate.

In line with the UMTS Enhanced Uplink method, on the other hand, the data having various priorities, i.e. the data from various priority queues, are transmitted in an MAC-e protocol data unit within a data transmission time interval.

One possible solution to signalling the association of an MAC-e SDU, i.e. an MAC-d PDU, for example, with a respective priority queue and with a respective MAC-d data stream would be to add to each MAC-e SDU a control data header with an identification of the respective MAC-d flow (flow-ID, FID) and then to add a control data header with an identification of the respective priority queue (queue ID, QID) to every single data packet from a priority queue before transmission, so as then to be able to split the data at the receiver again as appropriate in the data link layer.

However, this would be disadvantageous on account of the enormous volume of additional signalling data in the control data header (large overhead) which is required.

In line with the HSDPA method, the TFRI is used to signal the size of an MAC-hs protocol data unit. This is disadvantageous in the case of E-DCH particularly because data from various priority queues need to be transmitted in each data transmission time interval.

On the basis of the prior art, it is thus merely possible to signal the total size of an MAC-e protocol data unit but not how the data of an MAC-e protocol data unit need to be made up, i.e. from which priority queues how many and using what packet size it is necessary to transmit data in an MAC-e protocol data unit.

SUMMARY OF THE INVENTION

A data link layer protocol unit in a mobile radio device for mapping data which are to be transmitted using the mobile radio device from at least one logical channel onto at least one transport channel. The data link protocol unit has a plurality of data link layer protocol buffer storages, at least one transport format memory, at least one transport format selection unit, and a data link layer protocol buffer storage reading device. The plurality of data link layer protocol buffer storages for buffer storing logical channel data which are to be transmitted from one or more data link layer data streams of the logical channel data. The at least one transport format memory for storing a plurality of transport formats, with each transport format containing control parameters according to which the data are mapped from the at least one logical channel onto the at least one transport channel by the data link layer protocol unit, where the control parameters in at least some of the transport formats contain information regarding that or those data link layer protocol buffer storages and/or that or those data link layer data streams from which the data to be transmitted need to be transmitted in a data transmission time interval. The at least one transport format selection unit for selecting from the plurality of stored transport formats a respective transport format to be used. The a data link layer protocol buffer storage reading device which is set up such that it reads the data buffer stored in the data link layer protocol buffer storages on the basis of the selected transport format.

A mobile radio device having at least one data link layer protocol unit, a transport format memory for storing a plurality of transport formats, with a transport format containing control parameters according to which the data are mapped from at least one logical channel onto at least one transport channel by the data link layer protocol unit in another mobile radio device, where the control parameters in at least some of the transport formats contain information regarding that or those data link layer protocol buffer storages and/or that or those data link layer data streams from which the data to be transmitted need to be transmitted in a data transmission time interval, and a transport format transmission device which is set up to transmit the transport formats to the other mobile radio device.

A mobile radio network control unit having a transport format memory for storing a plurality of transport formats, with a transport format containing control parameters according to which the data are mapped from at least one logical channel onto at least one transport channel by the data link layer protocol unit in another mobile radio device, where the control parameters in at least some of the transport formats contain information regarding that or those data link layer protocol buffer storages and/or that or those data link layer data streams from which the data to be transmitted need to be transmitted in a data transmission time interval, and a transport format transmission device which is set up to transmit the transport formats to the other mobile radio device.

A method for reading data from a plurality of data link layer protocol buffer storages which are associated with at least one data link layer protocol unit, performed in a mobile radio device, the method comprising the step of selecting a transport format from a plurality of stored transport formats, with a transport format containing control parameters according to which the data are mapped from at least one logical channel onto at least one transport channel by the data link layer protocol unit, where the control parameters in at least some of the transport formats contain information regarding that or those data link layer protocol buffer storages and/or that or those data link layer data streams from which the data to be transmitted need to be transmitted in a data transmission time interval, wherein the data buffer stored in the data link layer protocol buffer storages are read on the basis of the control parameters.

BRIEF DESCRIPTION OF THE DRAWINGS

Exemplary embodiments of the invention are illustrated in the figures and are explained in more detail below.

In the figures,

FIG. 5 shows an illustration of an RRC message for signalling the weighting values and the weighting value ranges based on an exemplary embodiment of the invention; and FIG. 6 shows an outline to illustrate the processing of the data in an MAC-e protocol layer based on the exemplary embodiments of the invention.

DETAILED DESCRIPTION OF PREFERRED EMBODIMENTS OF THE INVENTION

Figure 1:
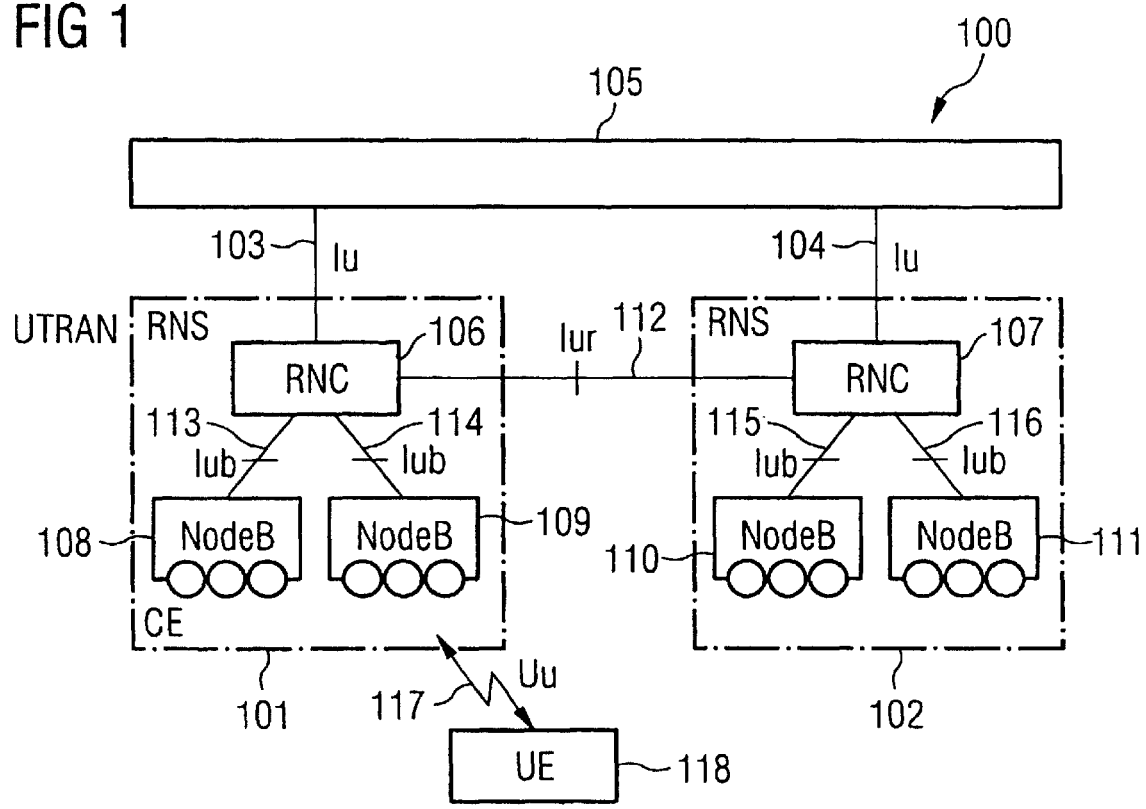
FIG. 1 shows a communication system based on an exemplary embodiment of the invention.

The invention is based on the problem of mapping data from at least one logical channel onto at least one transport channel in a data link layer protocol unit in simple fashion with reduced signalling complexity in comparison with known procedures.

The problem is solved by a data link layer protocol unit, by mobile radio devices, by a mobile radio network control unit and also by a method for reading data from a plurality of data link layer protocol buffer storages.

A data link layer protocol unit in a mobile radio device for mapping data which are to be transmitted using the mobile radio device from at least one logical channel onto at least one transport channel has a plurality of data link layer protocol buffer storages for buffer-storing the logical channel's data which are to be transmitted from one or more data link layer data streams of the logical channel's data. In addition, at least one transport format memory for storing a plurality of transport formats is provided. Each transport format contains control parameters according to which the data are mapped from the at least one logical channel onto the at least one transport channel by the data link layer protocol unit. At least some of the transport formats, in other words one or more, preferably all of the transport formats, contain, as control parameters, information specifying that or those data link layer protocol buffer storages and/or that or those data link layer data streams from which the data to be transmitted need to be transmitted in a data transmission time interval. A likewise provided transport format selection unit is set up to select a respective transport format to be used from the plurality of stored transport formats for at least one data transmission time interval. In addition, a data link layer protocol buffer storage reading device is provided which is set up such that it reads the data buffer-storaged in the data link layer protocol buffer storages on the basis of the selected transport format.

Each transport format thus clearly contains data transmission characteristics which are used for data transmission on the basis of a respective transport format. In other words, this means that each transport format contains the control parameters for setting the respective parameters used in the data link layer for mapping the data which are to be transmitted onto the transport channels which are used for the data transmission in the physical layer, for example the block size, the number of blocks in a set of blocks and the indication of the transmission time interval (TTI).

Clearly, the procedure described above means that a respective transport format is selected on the mobile radio device's data link layer protocol level for a data transmission time interval, and the transport format indicates, in respectively dedicated form, that or those data link layer protocol buffer storages and/or that or those data link layer data streams from which the data which are to be transmitted, i.e. the data which are to be mapped onto the transport channel, need to be read from the data link layer protocol buffer storages.

Hence, within a transport format, there is clearly signalling regarding those buffer storages or those data streams from the data streams provided above the data link layer from which the data need to be mapped onto the transport channel, particularly onto a transport block, within the data transmission time interval.

A mobile radio device has at least one data link layer protocol unit having the features presented above.

Another mobile radio device has at least one data link layer protocol unit and also a transport format memory for storing a plurality of transport formats, with one or more, preferably each, transport format containing control parameters according to which the data are mapped from at least one logical channel onto at least one transport channel by the data link layer protocol unit in another mobile radio device, where the control parameters in at least some of the transport formats contain information regarding that or those data link layer protocol buffer storages and/or that or those data link layer data streams from which the data to be transmitted need to be transmitted in a data transmission time interval.

In addition, a transport format transmission device is provided which is set up to transmit the transport formats to the other mobile radio device.

A mobile radio network control unit has a transport format memory for storing a plurality of transport formats, with a transport format containing control parameters according to which the data are mapped from at least one logical channel onto at least one transport channel by a data link layer protocol unit in another mobile radio device, where the control parameters in at least some of the transport formats contain information regarding that or those data link layer protocol buffer storages and/or that or those data link layer data streams from which the data to be transmitted need to be transmitted in a data transmission time interval. In addition, the mobile radio network control unit has a transport format transmission device which is set up to transmit the transport formats to the other mobile radio device.

In a method for reading data from a plurality of data link layer protocol buffer storages which are associated with at least one data link layer protocol unit and which method is performed in a mobile radio device, a transport format is selected from a plurality of stored transport formats, with a transport format containing control parameters according to which the data are mapped from at least one logical channel onto at least one transport channel by the data link layer protocol unit, where the control parameters in at least some of the transport formats contain information regarding that or those data link layer protocol buffer storages and/or that or those data link layer data streams from which the data to be transmitted need to be transmitted in a data transmission time interval. The data buffer-storaged in the data link layer protocol buffer storages are read on the basis of the control parameters.

Clearly, the invention can be seen in that a transport format now contains additional information regarding the data link layer protocol buffer storages and/or the data link layer data streams, said information being used to read data storaged in the data link layer buffer storages from the data link layer buffer storages.

Signalling this information in the transport formats allows or achieves very simple signalling of this information, preferably on the network, for a mobile radio device.

Clearly, what is provided is thus an expanded transport format, subsequently also called Enhanced Uplink transport format, which is used, during the mapping of data using the data link layer, to stipulate the makeup of the protocol data unit(s) formed by the data link layer protocol unit.

In this connection, for example when the mobile radio device is set up to communicate using the UMTS communication standard, a data link layer has one or more of the following sublayers:
    radio link control layer (RLC),
    packet data convergence protocol layer (PDCP),
    broadcast/multicast control layer (BMC),
    medium access control layer (MAC).

In addition, the mobile radio device preferably contains a weighting memory which storages weighting values and/or weighting value ranges, with a respective weighting value and/or weighting value range being associated with one of the data link layer protocol buffer storages. In other words, this means that at least one weighting value and/or one weighting value range is/are associated with each of the data link layer protocol buffer storages taken into account as part of the inventive procedure for reading the data buffer storages.

In this connection, it should be noted that the invention can be applied both to all and to just one or more sublayers of the data link layer, respectively, for example with the aforementioned sublayers or else the medium access control layer's sublayers described below. In other words, this means that the buffer storages provided in the respective sublayer can respectively be assigned a weighting value and/or a weighting value range in each sublayer individually or in all sublayers together.

In addition, the data link layer protocol buffer storage reading device is preferably set up such that it reads the data buffer-storaged in the data link layer protocol buffer storages from the data link layer protocol buffer storages in an order which is indicated by the priorities. The weighting values and/or weighting value ranges are used to indicate a respective proportion of the total data transmission bandwidth available for data transmission which is respectively allocated, i.e. reserved, for reading and transmitting the data stored in the respective data link layer protocol buffer storage.

Within the context of this description, the priority associated with a priority queue is to be understood to mean the relative or absolute significance of the data buffer-storaged in the respective priority queue's buffer storage.

A weighting value within the context of this description is to be understood to mean an indication of a data transmission bandwidth which is to be respectively allocated, in other words reserved, for reading the data stored in the respective data link layer protocol buffer storage.

A weighting value range within the context of this description is to be understood to mean an indication of a range for a data transmission bandwidth within which the data transmission bandwidth which is to be respectively allocated for reading the data stored in the respective data link layer protocol buffer storage can be chosen admissibly.

A mobile radio device which is preferably set up as a mobile radio base station, by way of example called NodeB in the cellular mobile radio system UMTS, likewise contains at least one data link layer unit.

The data buffer-storaged in the buffer storages are preferably read in an order which is indicated by the weighting values and/or weighting value ranges, with the weighting values and/or the weighting value ranges respectively being used to indicate a proportion of the total data transmission bandwidth available for data transmission which is respectively allocated for reading the data stored in the respective data link layer protocol buffer storage.

The respectively associated data transmission bandwidths are preferably always greater than zero. In one refinement of the invention, in the situation in which temporarily no data from a particular service are transmitted, provision is made for the network to be able to assign, possibly on a temporary basis, a data transmission bandwidth equal to zero Hz to the mobile radio device for a particular data buffer storage.

In this connection, it should be noted that the data link layer protocol buffer storages of one or more subprotocol layers and/or the weighting memory can be set up as one joint memory, with memory areas logically associated with the different memories, or else as separate memories.

In particular, the method for controlling the reading of the buffer storages of the data link layer is suitable for use in a mobile radio terminal, with the inherently known transport formats and also the inventive additional information in the transport formats, that is to say the information in the buffer storages or in the data link data streams from which the data are read and respectively mapped onto the logical channel, being prescribed preferably by the UTRAN, particularly preferably by a mobile radio network control unit and/or by the UMTS base station (NodeB).

In line with one refinement of the invention, the at least one data link layer protocol unit is in the form of one of the following units:
radio link control unit (Resource Link Control, RLC),
packet data convergence protocol unit (PDCP),
broadcast/multicast control unit (BMC).

In line with another refinement of the invention, the data link layer protocol unit is in the form of a medium access control unit, the medium access control unit being able to set up as a unit in one of the following subprotocol layers of the medium access control layer:

medium access control d subprotocol layer (MAC dedicated layer),
medium access control c/sh subprotocol layer (MAC control/shared),
medium access control b subprotocol layer (MAC broadcast) and/or
medium access control e subprotocol layer (MAC enhanced uplink).

If the data link layer protocol unit is in the form of a medium access control unit, the data link layer protocol buffer storages are medium access control unit protocol buffer storages and the data link layer data streams are medium access control unit data streams.

In line with another refinement of the invention, a data link layer protocol data unit generation unit is additionally provided for the purpose of generating a protocol data unit for the data on the basis of the respectively used data link layer protocol. Each protocol data unit generated by the data link layer protocol data unit generation unit has a control data range and a useful data range. The control data range contains control data based on the respective data link layer protocol, which is also to be understood to mean a corresponding data link layer subprotocol. The useful data range contains the useful data which are to be transmitted from the protocol layer (subprotocol layer) arranged above the data link layer protocol unit, that is to say the useful data which are to be transmitted from the logical channel. In addition, the data link layer protocol data unit generation unit is set up such that the information regarding that or those data link layer protocol buffer storages and/or that or those data link layer data streams from which the data contained in the generated protocol data unit which are to be transmitted have been read is written to the control data range of the protocol data unit.

In this way, very simple and efficient signalling of the assignment of the respective data to the data link layer protocol buffer storages and/or data link layer data streams is made possible without the need to indicate this assignment information to every single protocol data unit of the data link layer of the protocol layer arranged above the data link layer protocol unit in the mobile radio terminal.

Clearly, a control data header is thus indicated particularly for the Enhanced Uplink subprotocol layer and is provided with the following information:
from which MAC-d flow, identified by an MAC-d flow identification statement (flow ID, FID), and
from which priority queue, that is to say from which data link layer subprotocol buffer storage, identified by a priority queue identification statement (queue ID, QID), the data in the MAC-e protocol data unit (MAC-e PDU) which are provided by the MAC-d subprotocol layer and processed by the MAC-e subprotocol layer originate.

In this connection, it should be pointed out that the data processed by the MAC-e subprotocol layer are combined within a data transmission time interval (TTI), in other words the MAC-e SDUs from various MAC-d flows (MAC-d data streams) and various priorities, that is to say data from various priority queues, to form a protocol data unit and are transmitted in the transport channel. Preferably, the data link layer protocol data unit is set up such that the control data range formed is the header field, in other words the header of the protocol data unit. In other words, this means that preferably the information regarding the data link layer buffer storages and/or data link layer data streams is added to the header field of the protocol data unit of the data link layer protocol layer or preferably of the MAC-e subprotocol layer.

This information is thus preferably transmitted to another mobile radio device, preferably to a mobile radio base station.

The type of signalling, described above, of the information about the split and arrangement of the data which are to be transmitted from the data link layer protocol buffer storage or the data link layer data streams over the data link layer protocol data unit is particularly advantageous because directly successive data packets from a particular communication service, which data packets are very likely transmitted on the same data link layer data stream, for example the same MAC-d flow and via the same data link layer protocol buffer storage, preferably via the same priority queue, need to be provided just once with an identification of the corresponding MAC-d flow (FID) and/or the corresponding priority queue identification (QID) and hence the size of the control data to be transmitted in the data link layer protocol data unit, preferably in the MAC-e PDU, is reduced significantly.

In this connection, it should be noted that the signalling described above affords an advantage even if the data to be transmitted are distributed irregularly over the various data link layer buffer storages, preferably the various priority queues, since in this case at least the identification of the priority queue can be signalled for all data from a priority queue together.

In line with another refinement of the invention, provision is made for the data link layer protocol data unit generation unit to be set up such that the information regarding that or those data link layer protocol buffer storages from which the data to be transmitted which are contained in the generated protocol data unit have been read is written to the protocol data unit's control data range, and that the information regarding that or those data link layer data streams from which the data to be transmitted which are contained in the generated protocol data unit have been read is written to the protocol data unit's control data range in association with a respective one of the data link layer protocol buffer storages.

Clearly, this refinement of the invention means that the structure of the control data range, preferably of the protocol data unit's header field, is such that an upper structural plane of the control data range, i.e. of the control data header, lists for each individual priority queue, i.e. for each individual data link layer protocol buffer storage, which packet data units (N) of what packet size (SID) are to be transmitted from a priority queue, and a lower structural plane of the control data range of the protocol data unit, in other words of the control data header, signals how many successive data items (N) originate from which data link layer data stream, preferably from which MAC-d flow (FID).

If only the information regarding that or those data link layer protocol buffer storages from which the data to be transmitted are read is written to the control data range of the protocol data unit, provision is made for the information about the data link layer data streams to be added to each service data unit (SDU) of the data link layer protocol unit.

If only the information regarding that or those data link layer data streams from which the data to be transmitted have been read is written to the control data range of the protocol data unit, provision is made for the information regarding that buffer storage from which the respective data packets of the protocol layer which is arranged above the data link layer and which uses the services of the data link layer and supplies the data link layer with the respective data packets via the service access point are read to be added to a respective service data unit (SDU) of the data link layer protocol unit.

Particularly if the data link layer unit is set up as a medium access control e unit, it has a medium access subcontrol unit and an automatic repeat request control unit. At least some of the plurality of data link layer protocol buffer storages are set up as medium access control buffer storages in which the data are buffer-storaged. In other words, this means that the buffer storages are provided in the unit for splitting the data over the individual differently prioritized data buffer storages of the MAC-e protocol layer and/or as the buffer storages for the ARQ processes in the MAC-e protocol unit.

The automatic repeat request control unit is preferably set up in line with MAC-e to carry out a hybrid automatic repeat request method (HARQ method).

In line with one refinement of the invention, the automatic repeat request control unit is set up to carry out precisely one automatic repeat request process for each data link layer protocol buffer storage.

In line with another refinement of the invention, provision is made for the data link layer protocol unit to be set up to select a transport format for each automatic repeat request process.

In addition, the data link layer protocol buffer storages may be automatic repeat request buffer storages, with each automatic repeat request buffer storage being associated with one, preferably just one, automatic repeat request process. In line with this refinement of the invention, the data link layer protocol unit is set up such that the transport format(s) is/are selected on the basis of filling levels of the automatic repeat request buffer storages.

The text below explains a few preferred refinements of the mobile radio device described above.

In line with one refinement of the invention, a weighting setting unit is provided for prescribing the weighting values and/or the weighting value ranges on the basis of a respective quality of service used for the data transmission, in other words on the basis of a transport traffic class which is provided as part of the respective mobile radio system for data transmission and which is characterized by the respectively provided quality of service, for example. This achieves particularly simple and efficient processing of the data in the data link layer buffer storages and also simple and reliable signalling of the respective weighting of the buffer storages, while ensuring complete and timely transmission of the data buffer-storaged in the respective buffer storages in line with the respective prioritization associated with the data.

The weighting setting unit is preferably set up such that it prescribes weighting values which are within a respective weighting value range. In this way, the weighting setting unit and hence the mobile radio device can flexibly assign different weighting values and hence different data transmission bandwidths to the respective buffer storages which are being taken into account, and prescribing the respective weighting value ranges and hence prescribing the respective data transmission bandwidth ranges allow optimization of the reading and hence the data transmission from the mobile radio device to a mobile radio base station, for example.

In addition, in line with another refinement of the invention, a transmission control device, preferably set up in line with the Radio Resource Control layer based on UMTS, is provided for controlling mobile radio transmission resources of the mobile radio device.

In line with another refinement of the invention, the transmission control device is set up to receive the transport formats from another mobile radio device, which allows the transport formats to be prescribed by the other mobile radio device.

In this way, for the purpose of efficient signalling or for the purpose of configuration of the MAC-e protocol unit in the mobile radio device, the UMTS mobile radio network control unit (RNC) signals, preferably to the mobile radio terminal and to the UMTS base station (NodeB), how the data of an MAC-e protocol data unit, generally of a data link layer protocol data unit, may be made up, i.e. from which priority queues, generally from which data link layer protocol buffer storages, identified by means of priority queue identifiers, generally identified by means of data link layer protocol buffer storage identifiers, how many data items (SID) and in what packet size (N) data are to be transmitted in an MAC-e protocol data unit, generally in a data link layer protocol data unit.

Preferably, when choosing the parameters of the various data link layer protocol buffer storages (priority queues) the current transmission conditions are also taken into account.

By way of example, account is taken of the fact that possibly one or more priority queues have buffer-storaged no data for transmission, i.e. that a priority queue has zero times N bits (0*N bits) which are to be read, i.e. no data are to be read.

The information regarding those MAC-d flows and that priority queue from which the data for transmission originate is managed at the transmitter, preferably inside mobile radio terminals, and, when using the invention in an MAC-e subprotocol layer in the automatic repeat request control unit which is set up to carry out a hybrid automatic repeat request method, is inserted into the control data range, i.e. it is inserted into the control data header in the MAC-e protocol data unit.

The transmission control device is set up such that it receives weighting values and/or weighting value ranges from another mobile radio device, preferably from a mobile radio station, particularly preferably from a mobile radio network control unit (Resource Network Control Unit) and transmits them to, i.e. provides them for, the weighting setting unit, which means that the weighting values and/or weighting value ranges can be prescribed by the other mobile radio device.

This provides a very simple and reliable way of controlling the reading response of the data buffer storages in the data link layer of the mobile radio terminals from the mobile radio network, at the level of the radio network control protocol layer (RNC) based on UMTS, depending on the volume of data and the transmission quality in the respective mobile radio cell, for which mobile radio cell the mobile radio network control unit is responsible.

If appropriate, the mobile radio network control unit may also activate a handover. In addition, the mobile radio network control unit may be used to prescribe one or more transport formats temporarily as invalid or, by prescribing a set of transport formats, with the weighting values and/or weighting value ranges preferably being linked to the respective transport formats, to prescribe a selection of possible weighting values/weighting value ranges at least to some extent.

In line with another refinement of the invention, provision is made for the data link layer protocol buffer storage reading device to be set up such that if one or more data link layer protocol buffer storages have buffer-storaged no data for transmission then it additionally allocates the proportion or proportions of the data transmission bandwidth which is/are allocated for this or these data link layer protocol buffer storage(s) to the data link layer protocol buffer storage(s) which has/have buffer-storaged data for transmission.

The effect achieved by this is that during operation it is possible to react dynamically to a few buffer storages currently containing no buffer-storaged data for transmission. The data transmission bandwidths, in other words transmission resources, respectively allocated for these buffer storages are distributed in prescribable fashion, with particular preference evenly, i.e. in equal parts, alternatively on the basis of the proportions of data transmission bandwidth which have been associated with the respective buffer storages to date, over those buffer storages, in other words the free data transmission bandwidths are split over the buffer storages, which contain buffer-storaged data for transmission.

The mobile radio devices and also the mobile radio network control unit are preferably set up on the basis of a communication standard for communication on the basis of a cellular mobile radio system, preferably for communication on the basis of the cellular mobile radio system UMTS.

Particularly when the invention is used within the context of UMTS, important aspects of the invention can clearly be seen in that the weighting of the data buffer storages, particularly of the priority queues, i.e. to the buffer storages in the MAC subprotocol layer MAC-e in line with the demands on the quality of service which are made for the respective data, for efficient processing of the data from the data buffer-storaged in these data buffers, and are to be seen in very simple signalling of the weighting, i.e. of the weighting values and/or the weighting value ranges, from the UMTS base station or the RNC unit.

The signalling for configuring the inventive weighting of the data buffer storages in the data link layer, preferably in the MAC-e subprotocol layer, is effected in the form of radio resource control messages (RRC messages) from the mobile radio network control unit to the mobile radio terminal, also called subscriber terminal (user equipment, UE), and also via the "Iub" interface between the radio network control unit to the associated UMTS base station (NodeB).

The weightings, i.e. the weighting values, or the weighting value ranges which are assigned to the respective data buffer storages in the data link layer, preferably to the priority queues in the MAC-e subprotocol layer, can be explicitly signalled as a defined percentage of the total available data transmission bandwidths used. Thus, when three data link layer buffer storages are provided, for example, the first buffer storage with the highest priority can be assigned 50%, the data link layer protocol buffer storage with the second highest priority, in other words with medium priority, can be assigned 25%, and the third data buffer storage buffer-storing data with the lowest priority can be assigned 25% of the total available transmission bandwidth.

The data which are transmitted within a defined time interval via the E-dedicated channel (E-DCH) are in this case made up proportionally from the data which are buffer-storaged in the respective data buffer storages, in line with the signalled weighting (the signalled weighting values and the respective data buffer storages' associated data transmission bandwidths which are linked thereto).

In one advantageous variant, a priority queue buffer storage is provided in the MAC-e subprotocol layer for each data traffic class.

In this case, the weightings of the data buffer storages in the MAC-e subprotocol layer are not explicitly signalled, but rather the data traffic class is assigned to the weightings of the corresponding priority queues as stipulated previously, and in combination therewith the data transmission bandwidths provided which correspond to the priorities are allocated.

The data traffic classes provided on the basis of UMTS are explained in more detail below.

There are currently the following four data traffic classes provided on the basis of UMTS: conversational, streaming, interactive, background.

By way of example, the weighting values can be assigned to the priority queues on the basis of the data traffic classes such that streaming data are weighted with 40%, conversational data are weighted with 30%, interactive data are weighted with 20% and background data are weighted with 10%. In other words, this means that the streaming data are assigned 40% of the total available data transmission bandwidth, the conversational data are assigned 30%, the interactive data are assigned 20% and the background data are assigned 10%.

If a priority queue temporarily contains no data, in other words if the buffer storage for this priority queue currently contains no buffer-storaged data, then in line with one refinement of the invention the other priority queues are assigned more bandwidth, as was described above. By way of example, this can be done by virtue of the remaining available bandwidth, i.e. the data transmission bandwidth which is not required by the priority queues with "empty" buffer storages, being split over the other data buffer storages, preferably in equal parts.

To be able to match the weightings, i.e. the weighting values of the individual priority queues, generally of the data link layer protocol buffer storages, dynamically to the current transmission conditions, particularly to the current data buffer filling levels in the MAC-e sublayer, and also to the transmission situation in the respective mobile radio cell, weighting bands, also called weighting value ranges in this description, are clearly introduced, preferably for each of the data buffer storages considered and taken into account, alternatively for at least some of the data buffer storages taken into account, within which weighting bands the weighting can be lowered or raised by the mobile radio network, particularly by the UMTS base station NodeB, on the basis of the respective data buffer storage filling level, the data transmission situation in the respective mobile radio cell and the weightings of the other priority queues, generally of the other data link layer protocol buffer storages.

For this, the mobile radio network control unit RNC configures the UMTS base station using the Iub interface with the weighting bands, i.e. weighting value ranges, which are to be used within which the UMTS base station can then reconfigure the mobile radio terminal, which sends data to the UMTS mobile radio station using an uplink communication link, very quickly and dynamically the respective weighting values used, i.e. in other words the weights associated with the buffer storages and hence the respective data transmission bandwidths used and allocated.

If no or just very few data items are held in the data buffer storage of a priority queue, this priority queue and hence the respective data link layer protocol buffer storages are assigned only a low weighting within the weighting band, i.e. a small value for the weighting value within the weighting value range, preferably a weighting value which is at the lower limit range of the weighting value range. If the data buffer filling level in the respective data link protocol buffer storage is very high, this priority queue, generally this buffer storage, is assigned a higher weighting within the weighting band and hence a higher weighting value within the weighting value range, preferably a weighting value which is at the upper limit range of the weighting value range. Preferably, the dynamic matching of the weighting using the weighting bands is controlled by the mobile radio network, particularly by the UMTS base station.

When the weighting of a priority queue changes, the weightings, i.e. the weighting values, of the other priority queues are taken into account and are possibly adjusted accordingly.

To match the weighting of a priority queue to the data buffer filling level of the respective data buffer storage, two alternatives, in particular, are provided:

the percentage filling level of the respective data buffer storage is mapped on a one-to-one basis onto the weighting of the priority queue within the weighting band.

Priority queue data buffer storage threshold values are defined which, if they are exceeded, entail the weighting of the respective priority queue being discretely raised or lowered in a prescribed manner, i.e. by a prescribable value.

In this connection, it should be noted that the sum of all weightings which are associated with the priority queues, generally with the data link layer protocol buffer storages, can never exceed 100%.

If overlaps in the weighting bands of the priority queues mean that equal weightings arise, these are preferably processed with equality by taking, i.e. reading, the same number of data packets from all priority queues. Clearly, one fundamental aspect of the invention may be seen in the application of the inherently known weighted fair queueing principle, which involves the data streams being assigned to the individual queues, with each queue being assigned a weighting which represents a defined percentage of the total transmission bandwidth, to the specific area of application of the data link layer in a mobile radio communication system, preferably in a cellular mobile radio communication system, particularly preferably a UMTS mobile radio communication system.

The mobile radio device is preferably set up as a mobile radio terminal which is particularly preferably set up to receive and send data on the basis of one or more protocols of a cellular mobile radio system, for example GSM, preferably GPRS or UMTS.

With particular preference, the mobile radio terminal is thus set up to communicate in a UMTS mobile radio system, in other words the mobile radio terminal is set up to receive and send data on the basis of one or more protocols of a UMTS mobile radio system.

Particularly advantageous aspects of the invention can be seen in the introduction and transmission of an MAC-e control data header via the air interface for the purpose of efficient and mobile-radio-resource saving transmission of control data for the purpose of efficient receiver-end data processing of the received MAC-e protocol data units and also in the signalling from the UMTS mobile radio access network, preferably the mobile radio network control unit, to the mobile radio terminal and to the mobile radio base station of how the data of an MAC-e protocol data unit may be made up, i.e. from which priority queues how many and in what packet size MAC-e service data units (SDUs) are to be transmitted in an MAC-e protocol data unit.

FIG. 1 shows a UMTS mobile radio system 100, for reasons of simpler illustration particularly the components of the UMTS mobile radio access network (UMTS Terrestrial Radio Access Network, UTRAN), which has a plurality of mobile radio network subsystems (RNS) 101, 102 which are respectively connected by means of an "Iu" interface 103, 104 to the UMTS core network (CN) 105. A mobile radio network subsystem 101, 102 has a respective mobile radio network control unit (Radio Network Controller, RNC) 106, 107 and also one or more UMTS base stations 108, 109, 110, 111, which are also called NodeB in UMTS.

Within the mobile radio access network, the mobile radio network control units 106, 107 of the individual mobile radio network subsystems 101, 102 are connected to one another by means of an "Iur" interface 112. Each mobile radio network control unit 106, 107 respectively monitors the assignment of mobile radio resources for all the mobile radio cells in a mobile radio network subsystem 101, 102.

A UMTS base station 108, 109, 110, 111 is respectively connected to a mobile radio network control unit 106, 107 associated with the base station by means of an "Iub" interface 113, 114, 115, 116.

Each UMTS base station 108, 109, 110, 111 clearly provides radio coverage for one or more mobile radio cells (CE) within a mobile radio network subsystem 101, 102. Between a respective UMTS base station 108, 109, 110, 111 and a subscriber terminal 118 (user equipment, UE), subsequently also called mobile radio terminal, in a mobile radio cell, message signals or data signals are transmitted using an air interface, called Uu air interface 117 in UMTS, preferably using a multiple access transmission method.

By way of example, the UMTS-FDD mode (Frequency Division Duplex) is used to achieve separate signal transmission in the uplink and downlink directions (Uplink: signal transmission from the mobile radio terminal 118 to the respective UMTS base station 108, 109, 110, 111; downlink: signal transmission from the respective associated UMTS base station 108, 109, 110, 111 to the mobile radio terminal 118) through appropriate separate assignment of frequencies or frequency ranges.

A plurality of subscribers, in other words a plurality of activated mobile radio terminals 118 registered in the mobile radio access network, in the same mobile radio cell preferably have their signalling separated from one another using orthogonal codes, particularly using the "CDMA method" (Code Division Multiple Access).

In this connection, it should be noted that FIG. 1 shows only one mobile radio terminal 118 for reasons of simple illustration. In general, however any number of mobile radio terminals 118 are provided in the mobile radio system 100.

The communication between a mobile radio terminal 118 and another communication terminal can be set up using a complete mobile radio communication link to another mobile radio terminal, alternatively to a landline communication terminal.

Figure 2:
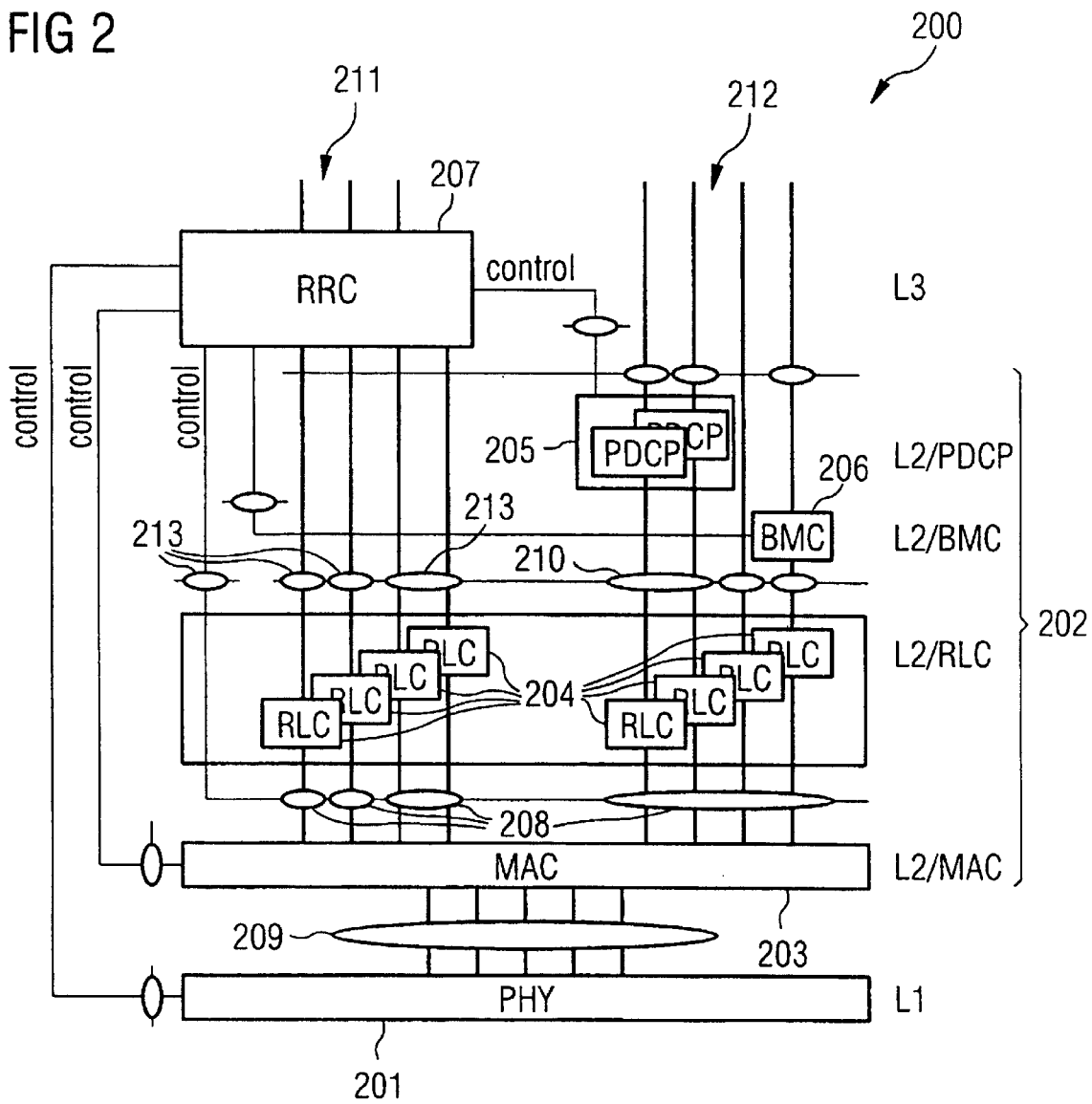
FIG. 2 shows an illustration of a protocol structure for the UMTS air interface.

As FIG. 2 shows, the UMTS air interface 117 is logically divided into three protocol layers (symbolized in FIG. 2 by a protocol layer arrangement 200). The units (entities) ensuring and providing the functionality of the respective protocol layers described below are implemented both in the mobile radio terminal 118 and in the UMTS base station 108, 109, 110, 111 or in the respective mobile radio network control unit 106, 107.

FIG. 2 shows the protocol structure 200 from the viewpoint of the dedicated transport channel DCH (dedicated channel).

The bottommost layer shown in FIG. 2 is the physical layer PHY 201, which represents the protocol layer 1 on the basis of the OSI reference model (Open System Interconnection) on the basis of the ISO (International Standardisation Organisation).

The protocol layer arranged above the physical layer 201 is the data link layer 202, protocol layer 2 on the basis of the OSI reference model, which for its part has a plurality of subprotocol layers, namely the Medium Access Control protocol Layer (MAC protocol layer) 203, the Radio Link Control protocol layer 204 (RLC protocol layer), the Packet Data Convergence Protocol protocol layer 205 (PDCP protocol layer), and also the Broadcast/Multicast Control protocol layer 206 (BMC protocol layer).

The topmost layer of the UMTS air interface Uu is the mobile radio network layer (protocol layer 3 on the basis of the OSI reference model), having the mobile radio resource control unit 207 (Radio Resource Control protocol layer, RRC protocol layer).

Each protocol layer 201, 202, 203, 204, 205, 206, 207 provides the protocol layer above it with its services via prescribed, defined service access points.

To provide a better understanding of the protocol layer architecture, the service access points have been provided with generally customary and unambiguous names, such as logical channels 208 between the MAC protocol layer 203 and the RLC protocol layer 204, transport channels 209 between the physical layer 201 and the MAC protocol layer 203, radio bearers (RB) 210 between the RLC protocol layer 204 and the PDCP protocol layer 205 or the BMC protocol layer 206, and also signalling radio bearers (SRB) 213 between the RLC protocol layer 204 and the RRC protocol layer 207.

On the basis of UMTS, the protocol structure 200 shown in FIG. 2 is split not just horizontally into the above-described protocol layers and units of the respective protocol layers, but also vertically into a "control protocol plane" 211 (Control plane, C plane), which contains parts of the physical layer 201, parts of the MAC protocol layer 203, parts of the RLC protocol layer 204 and also the RRC protocol layer 207, and the user protocol plane 212 (User plane, U plane), which contains parts of the physical layer 201, parts of the MAC protocol layer 203, parts of the RLC protocol layer 204, the PDCP protocol layer 205 and also the BMC protocol layer 206.

The units of the control protocol plane 211 are used to transmit exclusively control data, which are required for setting up and clearing down and also maintaining a communication link, whereas the units of the useful plane 212 are used to transmit the actual useful data.

Details regarding the protocol layer arrangement 200 are described in 3GPP TS 25.301, Technical Specification, Third Generation Partnership Project; Technical Specification Group Radio Access Network; Radio Interface Protocol Architecture (Release 1999).

Each protocol layer or each unit (entity) of a respective protocol layer has particular prescribed functions during mobile radio communication. The transmitter end needs to ensure the task of the physical layer 201 or of the units of the physical layer 201, the secure transmission via the air interface 117 of data coming from the MAC protocol layer 203. In this connection, the data are mapped onto physical channels (not shown in FIG. 2). The physical layer 201 provides the MAC protocol layer 203 with its services via transport channels 209 and these are used to stipulate how and with what characteristics the data are to be transported via the air interface 117. The fundamental functions which are provided by the units of the physical layer 201 include channel coding, modulation and CDMA code spreading. Correspondingly, the physical layer 201 or the entities of the physical layer 201 at the receiver end performs the CDMA code despreading, demodulation and the decoding of the received data and then forwards these data to the MAC protocol layer 203 for further processing.

The MAC protocol layer 203 or the units of the MAC protocol layer 203 provides or provide the RLC protocol layer 204 with its or their services using logical channels 208 as service access points and these are used to characterize what type of file the transported data involve. The task of the MAC protocol layer 203 in the transmitter, i.e. during data transmission in the uplink direction in the mobile radio terminal 118, is particularly to map the data which are present on a logical channel 208 above the MAC protocol layer 203 onto the transport channels 209 of the physical layer 201. The physical layer 201 provides the transport channels 209 with discrete transmission rates for this. It is therefore an important function of the MAC protocol layer 203 or of the entities of the MAC protocol layer 203 in the mobile radio terminal 118 in the transmission situation to select a suitable transport format (TF) for each configured transport channel on the basis of the respective current data transmission rate and the respective data priority of the logical channels 208 which are mapped onto the respective transport channel 209, and also the available transmission power of the mobile radio terminal 118 (UE). A transport format contains, inter alia, a stipulation of how many MAC data packet units, called transport block, are transmitted, in other words transferred, to the physical layer 201 via the transport channel 209 per transmission period TTI (Transmission Time Interval). The admissible transport formats and also the admissible combinations of the transport formats for the various transport channels 209 are signalled to the mobile radio terminal 118 by the mobile radio network control unit 106, 107 when a communication link is set up. In the receiver, the units of the MAC protocol layer 203 split the transport blocks received on the transport channels 209 over the logical channels 208 again.

The MAC protocol layer or the units of the MAC protocol layer 203 normally has or have three logical units. The "MAC-d unit" (MAC dedicated unit) handles the useful data and the control data, which are mapped onto the dedicated transport channels DCH (Dedicated Channel) via the corresponding dedicated logical channels DTCH (Dedicated Traffic Channel) and DCCH (Dedicated Control Channel). The MAC-c/sh unit (MAC control/shared unit) handles the useful data and the control data from logical channels 208, which are mapped onto the common transport channels 209, such as the common transport channel RACH (Random Access Channel) in the uplink direction or the common transport channel FACH (Forward Access Channel) in the downlink direction. The MAC-b unit (MAC broadcast unit) handles only the mobile radio cell-related system information, which is mapped via the logical channel BCCH (Broadcast Control Channel) onto the transport channel BCH (Broadcast Channel) and is transmitted by broadcast to all of the mobile radio terminals 118 in the respective mobile radio cell.

Using the RLC protocol layer 204 or using the units of the RLC protocol layer 204, the RRC protocol layer 207 is provided with its services by means of signalling radio bearers (SRB) 213 as service access points, and the PDCP protocol layer 205 and the BMC protocol layer 206 are provided with their services by means of radio bearers (RB) 210 as service access points. The signalling radio bearers and the radio bearers characterize the way in which the RLC protocol layer 204 needs to handle the data packets. To this end, by way of example, the RRC protocol layer 207 stipulates the transmission mode for each configured signalling radio bearer or radio bearer. The following transmission modes are provided in UMTS:

Transparent mode TM,
Unacknowledged mode (UM), or
Acknowledged mode (AM).

The RLC protocol layer 204 is modelled such that there is an independent RLC entity for each radio bearer or signalling radio bearer. In addition, the task of the RLC protocol layer or of its entities 204 in the transmission device is to split or assemble the useful data and the signalling data from radio bearers or signalling radio bearers into data packets. The RLC protocol layer 204 transfers the data packets produced after the split or the assembly to the MAC protocol layer 203 for further transport or for further processing.

The PDCP protocol layer 205 or the units of the PDCP protocol layer 205 is or are set up to transmit or to receive data from the "Packet Switched Domain" (PS domain). The main function of the PDCP protocol layer 205 is to compress or decompress the IP header information (Internet Protocol header information).

The BMC protocol layer 206 or its entities is or are used to transmit or to receive "cell broadcast messages" via the air interface.

The RRC protocol layer 207 or the entities of the RRC protocol layer 207 is or are responsible for setting up and clearing down and reconfiguring physical channels, transport channels 209, logical channels 208, signalling radio bearers 213 and radio bearers 210 and also for negotiating all of the parameters of the protocol layer 1, i.e. of the physical layer 201 and of the protocol layer 2. To this end, the RRC units, i.e. the units of the RRC protocol layer 207, in the mobile radio network control unit 106, 107 and the respective mobile radio terminal 118 interchange appropriate RRC messages, via the signalling radio bearers 213. Details regarding the RRC layer are described in 3GPP TS 25.331, Technical Specification, Third Generation Partnership Project; Technical Specification Group Radio Access Network; RRC Protocol Specification (Release 1999).

As described above, the mobile radio terminal 118 can communicate information about the volume of data traffic on a transport channel to its associated mobile radio network control unit 106, 107 at the RRC level in order to manage the mobile radio resources. In this case, the serving mobile radio network control unit (Serving Radio Network Controller, SRNC) is provided with an indication of the RLC data buffer filling levels of the transport channel in question, i.e. it is indicated how many data items there are currently in the respective RLC data buffer storages of the mobile radio terminal 118.

Using this information, the serving mobile radio network control unit 106, 107 can then perform appropriate configuration operations on the mobile radio terminal 118, for example in order to restrict or increase the usable transport formats of a mobile radio terminal 118 or to effect handover to another mobile radio cell, reconfiguration of the dedicated physical channels or an RRC state change from a first state CELL_DCH to a second state CELL_FACH.

The standardization committee 3GPP is currently working on improving packet data transmission by dedicated transport channels in the uplink for the UMTS-FDD mode.

In this connection, a dedicated transport channel called Enhanced-DCH (E-DCH) is provided. The fundamental characteristics of this new transport channel include the application of a hybrid automatic repeat request method (HARQ method) on the basis of the N-channel stop&wait method, scheduling controlled by a UMTS base station and provision of frame lengths of less than or equal to 10 ms. The HARQ transmission protection method is used to transmit an acknowledgement about correctly or incorrectly received data to the mobile radio terminal 118 from the network. For this function, the mobile radio terminal 118 contains various data buffer storages in order to buffer-store the data prior to acknowledgement of correct receipt. In addition, in line with the current proposal within the context of the Enhanced DCH transport channel, provision is made for the data to be split over various data buffer storages, known as priority queues, in accordance with the priorities of said data, with the data being buffer-storaged in the data buffer storages in line with their importance, i.e. their prioritization, and hence being processed preferentially or less preferentially according to their buffer-storage in the respective buffer storage of a prescribed priority.

Figure 3:
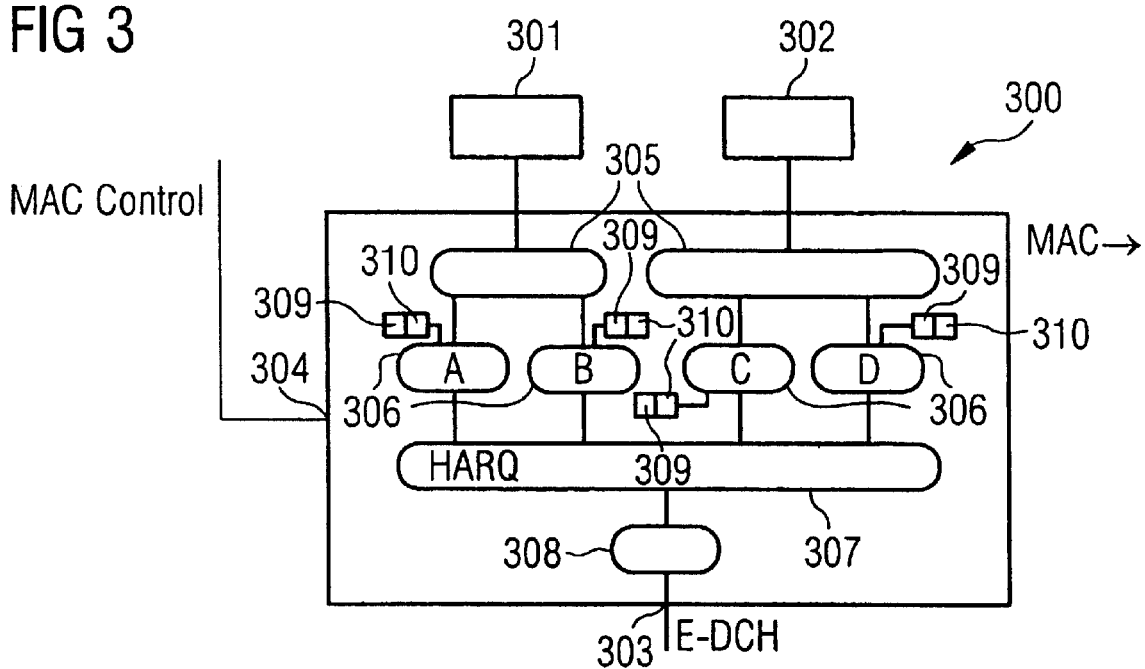
FIG. 3 shows an illustration of the units in an MAC-e protocol layer based on a first exemplary embodiment of the invention.

Both functions are implemented in a new sublayer of the MAC protocol layer 203, as illustrated in line with a first embodiment in FIG. 3 as MAC-e (MAC enhanced uplink) subprotocol layer 300, which is likewise implemented both on the terminal, i.e. in the mobile radio terminal 118, and on the network, i.e. in a UMTS base station 108, 109, 110, 111. The MAC-e subprotocol layer 300 receives its data from the MAC-d subprotocol layer via "MAC-d flows" 301, 302 and in turn transmits its data via the E-DCH transport channel 303 to the physical layer 201.

The MAC-e subprotocol layer 300 or its entities communicates or communicate, for example for the purpose of configuration, with the RRC protocol layer 207 via the MAC control access point 304.

In the MAC-d subprotocol layer, one or more logical channels are multiplexed onto an MAC-d flow 301, 302, with each MAC-d flow 301, 302 in the MAC-d subprotocol layer being assigned a priority, said priority being used by the function priority queue distribution, implemented in a priority queue distribution unit 305 in the MAC-e subprotocol layer 300, to split the data over the data buffer storages 306 with the different priorities, i.e. for processing using data of different priorities in a respective data buffer storage, with a data buffer storage respectively buffer-storing data of one priority.

The data buffer storage in the priority queues 306 then buffer-stores the data until they are retrieved for transmission using an HARQ unit 307.

In line with the N-channel stop&wait HARQ method, the HARQ unit 307 comprises a number of N "HARQ processes", with an HARQ process representing a respective instance of the stop&wait method. For each HARQ process, the HARQ unit 307 takes a number of packet data units (PDUs) according to their priority from the data buffer storages of the priority queues 306 and forwards them via the E-DCH transport channel 303 to the physical layer 201, where they are then transmitted to the network via dedicated physical channels using the air interface 117.

The HARQ unit 307 buffer-storages the packet data units (PDUs) transmitted for each HARQ process in an appropriate HARQ buffer storage (not shown) until successful transmission has been acknowledged by the network.

A TF selection unit 308 coupled to the HARQ unit 307 is responsible for selecting the transport format suitable for transmission for each HARQ process.

In the MAC-e subprotocol layer 300, this is done by using the RRC protocol layer 207 to configure a set of different transport formats from which the TF selection unit 308 selects a suitable one for each transmission time interval (TTI) and HARQ process.

The MAC-e subprotocol layer 300 is set by the mobile radio network control unit 106, 107 using the RRC protocol layer.

A mobile radio subscriber uses the mobile radio terminal 118, preferably in the mobile radio device described above, to use a service based on UMTS the UMTS mobile radio core network 105 provides this requested service in a prescribed, defined quality of service (QoS) which corresponds to the Quality of Service requirements of the service in question.

In line with UMTS, the following four traffic classes for classifying provided services are currently defined, which are distinguished by their specific data transmission characteristics and quality requirements:

Conversational:
  The conversational traffic class is provided for real-time applications between subscribers. These include applications such as voice telephony and video telephony. Communication links in this traffic class require a constant, i.e. guaranteed, data transmission rate and hence data transmission bandwidth with short time delays during data transmission. On the other hand, a conversational application is insensitive toward brief data transmission errors.

Streaming:
  The streaming traffic class is provided for realtime distribution services such as video and audio in which data are transmitted unidirectionally, for example from a server computer to a client computer, with the realtime distribution services allowing the receiver to play back the data and present them to a user of the receiver mobile radio device during the actual transmission. During streaming, a continuous data stream is set up, so that communication links in this traffic class require a constant, i.e. guaranteed, data transmission rate and hence data transmission bandwidth. However, a streaming application is insensitive toward short data transmission delays and in this respect makes no stringent demands in comparison with an application in the conversational traffic class.

Interactive:
  The interactive traffic class is provided for interactive applications, such as internet surfing, games and chat. The communication links in this traffic class require no constant data transmission rate and hence data transmission bandwidth, but place great demands on the integrity of the data transmission, i.e. they require a very low bit error rate.

Background:
  Applications in the background traffic class transmit data with a low priority in the background. Examples are the downloading of data, the receipt of e-mail (electronic mail) and SMS (Short Message Service). Communication links in this traffic class require no constant data transmission rate and hence data transmission bandwidth and are insensitive toward time delay during data transmission. On the other hand, they place great demands on the integrity of transmission, i.e. they require a very low bit error rate.

In detail, the quality of service of a communication service which has been provided is described using various attributes, such as the maximum bit rate, the guaranteed bit rate or the maximum transmission delay for the respective communication service.

Hence, when a mobile radio subscriber is provided with a requested communication service in a defined quality of service QoS by the mobile radio core network 105 the mobile radio core network 105 stipulates the associated QoS attributes in appropriate fashion.

When the communication link is set up (connection setup), the subscriber and hence the subscriber mobile radio terminal 118 are allocated the appropriate mobile radio resources required for the communication link, such as the necessary CDMA spreading codes, on the network, i.e. on the UTRAN, by the mobile radio network control unit 106, 107, and the protocols of the protocol layers 1 and 2 are configured such that the communication service can be secured with the negotiated quality of service for the duration of the communication link.

The negotiated quality of service of a communication service can be reconfigured during an existing communication link by the mobile radio core network 105, for example on account of scarce mobile radio resources or increasing interference in the mobile radio cell.

Again with reference to FIG. 3, the text below explains details relating to the stop&wait method used (also called send&wait method) and also the HARQ method used (Hybrid Automatic Repeat Request method).

The N-channel stop&wait HARQ method is a data transmission protection method in which a number of N "HARQ processes" is configured in a mobile radio terminal 118, an HARQ process respectively being an instance of the stop&wait method.

For each HARQ process, the data are transmitted to the communication network, particularly the mobile radio base station, and are buffer-storaged until the communication network receives a positive acknowledgement message about correctly received data (Acknowledgement, ACK). Otherwise, i.e. if data have not been received correctly, which is communicated by means of a negative acknowledgement message. (Negative Acknowledgement, NACK), the data are sent to the mobile radio communication network again.

The "NodeB-controlled scheduling" is a method in which the scheduling in the mobile radio terminal 118, i.e. the selection of an appropriate transport format from a set of defined transport formats for the E-DCH transport channel, is controlled such that the NodeB 108, 109, 110, 111 can temporarily restrict the use by the mobile radio terminal 118 of transport formats from the set of defined transport formats for the E-DCH transport channel on the basis of the traffic situation in the respective mobile radio cell.

Both functions, i.e. the functionality of the HARQ method and the functionality of the stop&wait method, are implemented in the MAC-e (MAC-enhanced uplink) subprotocol layer within the MAC layer, with the MAC-e subprotocol layer being provided, i.e. implemented, both on the terminal and on the network. On the network, the MAC-e subprotocol layer is located in the NodeB 108, 109, 110, 111.

FIG. 3 shows the MAC-e architecture on the terminal by way of example, i.e. it shows how the functionality of the MAC-e subprotocol layer is implemented in the mobile radio terminal 118.

For the exemplary embodiments shown, a transmission scenario is assumed in which a user of the mobile radio terminal 118 uses three packet services in the uplink at parallel times, for example one service for interactive gaming on the internet, one service for downloading text files and one service for streaming video data.

These packet data are transmitted from the mobile radio terminal 118 via the E-DCH transport channel 303 to the mobile radio communication network, i.e. to the serving mobile radio network control unit 106 and the base station 109 via the air interface 117. When the communication link is set up, the mobile radio terminal 118 is to this end sent configuration messages about the RRC protocol layer 207, implemented both in the mobile radio network control unit 106 and in the mobile radio terminal 118, which the RRC protocol layer 207 can use in the mobile radio terminal 118 to configure the protocol layers which are situated below it on the basis of the communication layer model.

In line with this exemplary embodiment, two MAC-d flows 301, 302 are configured for the entity of the MAC-e subprotocol layer 300, with just one respective logical channel being multiplexed on an MAC-d flow 301, 302, and the data of the packet services being transmitted on the respective associated logical channel.

In addition, a respective priority queue 306 and in the HARQ unit four HARQ processes with a respective HARQ buffer storage are configured for each MAC-d flow 301, 302.

In addition, a plurality of different transport formats is configured for the E-DCH transport channel 303, from which transport formats the transport format selection unit 308 (TF selection) needs to find a suitable transport format for each transmission time interval (TTI) and HARQ process. The data from the MAC-d flows 301, 302 are assigned to the individual priority queues 306 according to their priority and are transmitted.

In the MAC-d subprotocol layer, one or more logical channels are multiplexed onto an MAC-d flow 301, 302, with each MAC-d flow 301, 302 in the MAC-d subprotocol layer being assigned a priority which the priority queue distribution unit 305 uses to split the data over the respective priority queues 306 and hence the priority queue buffer storages with the different priorities. The data buffer storages of the priority queues 306 then buffer-storage the data until they are retrieved, i.e. read, by the HARQ unit 307 for the purpose of data transmission.

As described above, the different transport formats are transmitted from the mobile radio network control unit 106 to the mobile radio terminal 118 and are storaged there.

In addition, as the table below shows, each transport format has a respective indication of how the MAC-e protocol data units need to be configured, in other words set up. The values shown in the table below are not a restriction of the general validity of this procedure.

| TF | PQ #1 # of TBs | PQ #1 TB size (bit) | PQ #2 # of TBs | PQ #2 TB size (bit) | PQ #3 # of TBs | PQ #3 TB size (bit) |
|---|---|---|---|---|---|---|
| #1 | 0 | 100 | 0 | 100 | 0 | 100 |
| #2 | 1 | 100 | 0 | 100 | 0 | 100 |
| #3 | 0 | 100 | 1 | 100 | 0 | 100 |
| #4 | 0 | 100 | 0 | 100 | 1 | 100 |
| ... | ... | ... | ... | ... | ... | ... |
| #10 | 2 | 200 | 2 | 100 | 0 | 100 |
| #11 | 3 | 200 | 2 | 100 | 1 | 100 |
| #12 | 2 | 300 | 1 | 200 | 2 | 100 |
| ... | ... | ... | ... | ... | ... | ... |
| # n | 5 | 300 | 3 | 300 | 1 | 300 |

In the table:
a first column (TF) indicates the number of the respective transport format,
a second column (PQ#1/# of TBs) indicates a number of data packets in the first priority queue A 306 that is admissible on the basis of the respective transport format,
a third column (PQ#1/TB size (bit)) indicates the size of the transport block in bits in which the data packets in the first priority queue A 306 are intended to be inserted into the MAC-e protocol data unit,
a fourth column (PQ#2/# of TBs) indicates a number of data packets in the second priority queue B 306 that is admissible on the basis of the respective transport format,
a fifth column (PQ#2/TB size (bit)) indicates the size of the transport block in bits in which the data packets in the second priority queue B 306 are intended to be inserted into the MAC-e protocol data unit,
a sixth column (PQ#3/# of TBs) indicates a number of data packets in the third priority queue C 306 that is admissible on the basis of the respective transport format, and
a seventh column (PQ#3/TB size (bit)) indicates the size of the transport block in bits in which the data packets in the third priority queue C 306 are intended to be inserted into the MAC-e protocol data unit.

Thus, in line with a first transport format (#1), for example, provision is made for no data to be transmitted using the MAC-e subprotocol unit.

In line with a fourth transport format (#4), by way of example no data packet in the first priority queue A 306 is admissible (value "0" in the second column), no data packet in the second priority queue B 306 is admissible (value "0" in the fourth column) and one data packet with a size of 100 bits in the third priority queue C 306 is admissible (value "1" in the seventh column and value "100" in the seventh column of the table).

In addition, the protocol data unit of the MAC-e subprotocol layer has been set up for a twelfth transport format (#12), for example, such that two data packets with a size of 300 bits each in the first priority queue A 306 are added to the protocol data unit, one data packet with a size of 200 bits from data packets in the second priority queue B 306, and also two data packets with a size of 100 bits each from the third priority queue C 306. Hence, in line with this transport format, an MAC-e PDU needs to be formed with two data packets with a size of 300 bits, one data packet with a size of 200 bits and two data packets with a size of 100 bits.

In line with these possible combinations which are shown in the table and are storaged in the mobile radio terminal 118, the MAC-e subprotocol layer 300 selects a suitable expanded transport format for each data transmission time interval, as explained in more detail below with reference to FIG. 6.

FIG. 6 shows the structure of an MAC-e PDU control data header in a block diagram 600, and this structure is explained in more detail below.

As FIG. 6 shows and as explained above in detail, the MAC-e subprotocol layer 300 is supplied with the data for transmission, i.e. the MAC-e SDUs, using the MAC-d flows 301, 302 from the MAC-d subprotocol unit.

In line with this exemplary embodiment of the invention, the first MAC-d flow 301 has a first MAC-d protocol data unit (MAC-d PDU$_{1,2}$) 601 and a second MAC-d protocol data unit (MAC-d PDU$_{1,1}$) 602. In addition, the second MAC-d flow 302 has a third MAC-d protocol data unit 603 (MAC-d PDU$_{2,2}$) and a fourth MAC-d protocol data unit 604 (MAC-d PDU$_{2,1}$).

Using the priority queue distribution unit 305, the individual MAC-d protocol data units are split over the individual priority queues 306 on the basis of their importance, i.e. on the basis of their priority, and are buffer-storaged in the priority queue buffer storages of the priority queues 306.

In line with the exemplary embodiment shown in FIG. 6, the fourth MAC-d protocol data unit 604, provided with a second MAC-d flow identifier 605 (FID$_{\#2}$), is assigned to the first priority queue A 306, as is the first MAC-d protocol data unit 601, provided with a first MAC-d flow identifier 606 (FID$_{\#1}$) which identifies the first MAC-d flow 301.

The priority queue distribution unit 305 also supplies the second MAC-d protocol data unit 602, provided with the first MAC-d flow identifier 606 (FID$_{\#1}$), to the second priority queue B 306, as well as the third MAC-d protocol data unit 603, but this is provided with the second MAC-d flow identifier 605 (FID$_{\#2}$).

In line with the respectively selected transport format and the above-described additional information, associated with the respective transport format, regarding the number and size of the data packets which are respectively to be read from a priority queue 306 and to be added to the MAC-e PDU, the HARQ unit 307 in cooperation with the transport format selection unit 308 reads and adds to the MAC-e protocol data unit, which is explained in more detail below.

Hence, as described above, the MAC-e SDUs are split according to their importance, that is to say their priority, over the various priority queues 306 using the priority queue distribution unit 305.

Since the data in various MAC-d flows 301, 302 can be transferred to a priority queue 306, this exemplary embodiment involves the information regarding which MAC-e SDU comes from which MAC-d flow 301, 302 (identified by means of the flow ID, FID) being buffer-storaged, preferably internally, by means of the MAC-e subprotocol layer.

FIG. 6 thus shows the MAC-d flow identification statement 605, 606 merely in dashes, thus symbolizing that this information is preferably not added to the data packet, i.e. to the MAC-e protocol data unit, and hence is not transmitted via the air interface.

As explained in more detail below, the HARQ unit 307 is used to set up the MAC-e protocol data unit 607, whose structure is shown in detail in FIG. 6.

To set up the MAC-e protocol data unit 607, the HARQ unit 307 retrieves, i.e. reads, the data from the various priority queues 306 according to particular criteria, such as the priorities of the data or the weightings or weighting value ranges transmitted using an RRC message, as explained in more detail below, for the individual priority queues 306. This is done on the basis of the respective transport format selected using the transport format selection unit 308 (TF selection).

In addition, the HARQ unit 307 adds a control data header, i.e. an MAC-e header, to data which have been read from the priority queues 306. The header, in other words the control data range 608 of the MAC-e subprotocol layer, has a version number field 609 for holding a version number (V) and also a sequence number field 610 indicating a sequence number which is increased continuously for every MAC-e protocol data unit, i.e. a serial sequence number (Transmission Sequence Number TSN). The sequence number is required in order to perform the HARQ transmission protection method at the level of the MAC-e subprotocol layer.

As FIG. 6 shows, in line with the preferred embodiment an upper structural plane (denoted by the reference symbol 611 in FIG. 6) of the control data range 608 contains precisely one identifier of the identity of the priority queue 306, in line with this embodiment in a priority queue identifier field 612, for a particular number of data packets SID (Size Index) originating from the same priority queue 306. A data packet number field 613 indicates for the data in the respective priority queue 306 how many data packets from this priority queue 306 are contained in the MAC-e protocol data unit 607.

In addition, a lower structural plane of the control data range 608, in other words the control data header (denoted by the reference symbol 614 in FIG. 6), indicates from which MAC-d flow how many successive data packets originate.

These statements are repeated within the upper structural plane 611 for each MAC-d flow 301, 302.

Hence, as FIG. 6 shows, an MAC-d flow identifier field 615 and also an MAC-d flow data packet number field 616 are respectively included for each MAC-d flow.

The information regarding how many data packets are transmitted in an MAC-e protocol data unit 607 from which MAC-d flow 301, 302 is indicated in the respectively selected transport format and is described in the table shown above, for example.

In one alternative embodiment of the invention, the full identifiers are not specified and transmitted in the MAC-e protocol data unit 607 to the mobile radio base station 109, but rather only an index for a row in a table or a pointer to a row in a table which explicitly storages the order and the number of data packets in a respective priority queue 306 and the size thereof.

In this case, this table is stored both on the terminal and on the network, which means that just one index for the respective table row needs to be written to the control range of the MAC-e protocol data unit 607, which additionally achieves significant savings in terms of bits required in the control data range 608, i.e. in the header field of the MAC-e protocol data unit 607, and still permits explicit coding and decoding of the data on the basis of the MAC-e protocol, i.e. particularly splitting of the multiplexed data over the respective priority queues 306 and the MAC-d flows at the receiver, particularly in the mobile radio base station 109.

At the end of one or more information elements in the lower structural plane 614, a flag 617 is provided which indicates whether there are further control data or useful data following the flag 617 in the MAC-e protocol data unit 607. The MAC-d protocol data units 604, 606 storazed in a useful data range 618 of the MAC-e protocol data unit 617 are added to the MAC-e protocol data unit 617 on the basis of the selected transport format and/or the weightings and/or the weighting bands.

In the control data range 608, the data in the upper structural plane 611 are repeated for every considered priority queue 306 for the data which are to be transmitted in the respective MAC-e protocol data unit 617.

To fill the total length of an MAC-e protocol data unit 607 to a length which is suitable or required for transmission, this exemplary embodiment of the invention has provision for filling bits, which are also called padding bits, also to be inserted in a padding range 619 at the end of the MAC-e protocol data unit 607.

The MAC-e protocol data unit 607 formed is supplied to the physical layer via the E-DCH and is transmitted to the mobile radio base station 109 using said physical layer.

Upon receipt of the MAC-e protocol data unit 607, the mobile radio base station 109, generally at the receiver, uses the MAC-e subprotocol layer unit there, in line with the information contained in the control data range 608, to split the data over the various "reordering queues", which correspond to the priority queues of the MAC-e subprotocol layer of the sending mobile radio device, and over the respective MAC-d flows 301, 302.

Figure 4:
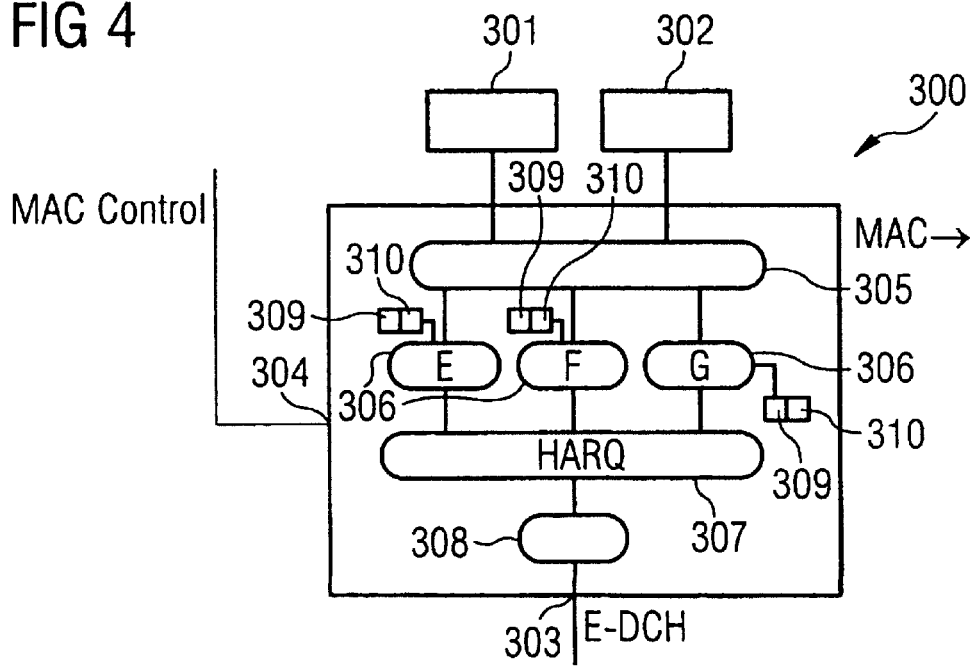
FIG. 4 shows an illustration of the units in an MAC-e protocol layer based on a second exemplary embodiment of the invention.

The procedure shown in FIG. 6 and described above for creating the MAC-e protocol data unit 607 applies both to the refinement of the MAC-e subprotocol layer shown in FIG. 3 and to the MAC-e subprotocol layer shown in FIG. 4.

The text below gives a more detailed explanation of how and on the basis of what rules the data packets are read from the individual priority queues 306.

As FIG. 3 and FIG. 4 show, the UTRAN uses an RRC message 500, as shown by way of example in FIG. 5, to signal to the mobile radio terminal 118 the weighting of the individual priority queues 306 (explicit PQ weighting) and additionally the weighting bands within which the weighting of the priority queues 306 can be lowered and raised dynamically by the mobile radio communication network, particularly by the UMTS base station 108, 109, 110, 111, on the basis of the respective data buffer storage filling level of the priority queues 306, the data transmission situation in the respective mobile radio cell and the weightings of the other priority queues 306 in the mobile radio terminal 118 (Priority Queue Weighting Band).

The weightings, i.e. in other words the weighting values 309 and also the weighting value ranges (i.e. the weighting bands) 310 are storazed in a weighting memory (not shown) in the mobile radio terminal 118.

Each priority queue 306 has a weighting value 309 and a weighting value range 310, respectively, explicitly associated with it.

FIG. 5 shows an example of the structure of the RRC message 500 which is used to transmit the weighting values 309 and also the weighting value ranges 310 for the respective priority queues 306.

In this context, without any restriction to the general validity, it is assumed that the mobile radio terminal 118 uses appropriate RRC messages to signal to the mobile radio communication network the respective data buffer storage filling levels of the data buffers of the individual priority queues 306 on a regular basis, i.e. preferably at prescribed times or upon request by the mobile radio network control unit 308.

As FIG. 5 shows, the RRC weighting value message 500 contains the following data:
   a statement indicating the respective priority queue 501,
   a statement indicating the respective weighting value 502, and
   a statement indicating the weighting band, i.e. the weighting value range 503, with the weighting value range 503 being provided by a statement indicating a lower weighting value 504, i.e. a minimum permissible weighting value, and also by an upper weighting value 505, i.e. a maximum permissible weighting value.

For the exemplary embodiment shown in FIG. 3, it may be assumed that the following values are configured for the four priority queues 306:
   First, explicitly the weighting values 309
   for the first priority queue A 50% of the total available data transmission bandwidth,
   for the second priority queue B 30% of the total available data transmission bandwidth,
   for the third priority queue C 15% of the total available data transmission bandwidth, and
   for the fourth priority queue D 5% of the total available data transmission bandwidth.

In addition, the individual priority queues 306 have the following associated weighting values 310:
   for the first priority queue A a first weighting value range from 30% to 60% of the total available data transmission bandwidth,
   for the second priority queue B 10% to 40% of the total available data transmission bandwidth,
   for the third priority queue C 5% to 30% of the total available data transmission bandwidth, and
   for the fourth priority queue D 2% to 15% of the total available data transmission bandwidth.

It should again be pointed out that when the weighting values within the respective weighting value ranges 310 vary it is necessary to ensure that the sum of the weighting values of the four, in line with FIG. 4 of the three, weighting values 309 do not exceed the value 100%, since otherwise more data transmission bandwidth would need to be allocated than is actually available.

In line with these exemplary embodiments of the invention, different definitions are provided for priority queues.

As FIG. 3 shows, each priority queue 306 may be permanently associated with an MAC-d flow 301, 302, and for each MAC-d flow there are N priority queues 306 for the various priorities. In this case, N corresponds to the number of priorities of the logical channels 208 which are multiplexed on the respective MAC-d flow.

Alternatively, provision may be made, as FIG. 4 shows, for each priority queue 306 to be able to receive data from all the MAC-d flows 301, 302, and in this case there are N priority queues 306 for all the MAC-d flows together. In this case, N corresponds to the number of different priorities of the logical channels 208 which are multiplexed onto the MAC-d flows.

In a third alternative embodiment of the priority queues 306, provision is made for a priority queue to be provided for each defined traffic class. There are N priority queues 306 for all the MAC-d flows 301, 302 together, as FIG. 4 shows. In this case, N corresponds to the number of traffic classes, for example N=4 when the four traffic classes "conversational", "streaming", "Interactive" and "background" are defined.

In this case, the MAC-d subprotocol layer provides the MAC-e subprotocol layer 300 with information about the priorities of the logical channels 208 which are multiplexed onto an MAC-d flow, and the priority queue distribution unit 305 in the MAC-e subprotocol layer 300 then uses this information to split the data over the individual priority queues 306.

In the exemplary embodiment shown in FIG. 4, there are thus three priority queues 306 provided which are respectively assigned a weighting value 309 and a weighting value range 310 in the way illustrated above at the appropriate point.

In line with this exemplary embodiment, the individual priority queues 306 have the following associated weighting values 309:

for the first priority queue E 50% of the total available data transmission bandwidth,
for the second priority queue F 25% of the total available data transmission bandwidth, and
for the third priority queue G 25% of the total available data transmission bandwidth.

In addition, the individual priority queues 306 have the following associated weighting value ranges 310, i.e. weighting bands:

for the first priority queue E a weighting value range from 30% to 60% of the total available data transmission bandwidth,
for the second priority queue F a weighting value range from 10% to 40% of the total available data transmission bandwidth, and
for the third priority queue G a weighting value range from 10% to 40% of the total available data transmission bandwidth.

As the data are being read from the respective priority. queue data buffer storages, the data are read on the basis of the data transmission bandwidth allocated in line with the weighting value 309 which is currently assigned to each respective priority queue 306.

This also means that during the existing mobile radio communication link for transmitting the useful data per unit time TTI the data packets buffer-storaged in the priority queue buffer storages are transmitted proportionally via the E-DCH transport channel 303 from the various priority queues 306 in line with their explicit weighting (i.e. the weighting values) and the selected transport format.

If there are temporarily only very few data items in the data buffer storage of a priority queue 306, this priority queue 306 is assigned only a low weighting within the weighting band, i.e. within the weighting value range, by the UMTS base station 308, 309, 310, 311.

This means that a weighting value is selected and is assigned to the respective priority queue 306, which is close to the lower, i.e. minimum permissible, weighting value 504 in the weighting value range 503.

If the data buffer storage filling level of the data buffer storage for the respective priority queue 306 is temporarily very high, on the other hand, the UMTS base station 308, 309, 310, 311 assigns the priority queue 306 a higher weighting within the weighting band, preferably a weighting value which is close to the upper, i.e. maximum permissible, weighting value 505 in the respective weighting value range 503.

The invention claimed is:

1. A data link layer protocol unit in a mobile radio device for mapping data which are to be transmitted using the mobile radio device from at least one logical channel onto at least one transport channel, comprising:
    a plurality of data link layer protocol buffer storages set up to buffer store data which are to be transmitted;
    at least one transport format memory set up to store a plurality of transport formats, with each transport format containing control parameters according to which the data are mapped from the at least one logical channel onto the at least one transport channel by the data link layer protocol unit, where the control parameters in at least some of the transport formats contain information specifying the one or more data link layer protocol buffer storages and one or more data link layer data streams from which the data to be transmitted need to be transmitted in a data transmission time interval;
    at least one transport format selection unit set up to select from the plurality of stored transport formats a respective transport format to be used; and
    a data link layer protocol buffer storage reading device set up to read the data buffer stored in the data link layer protocol buffer storages based on the selected transport format.

2. The data link layer protocol unit as claimed in claim 1, wherein the data link layer protocol unit is in the form of a radio link control unit, a packet data convergence protocol unit, or a broadcast/multicast control unit.

3. The data link layer protocol unit as claimed in claim 1, set up as a medium access control unit,
    wherein the data link layer protocol buffer storages are medium access control unit protocol buffer storages, and the data link layer data streams are medium access control unit data streams.

4. The data link layer protocol unit as claimed in claim 1, further comprising a data link layer protocol data unit generation unit which
    is set up to generate a protocol data unit which has a control data range and a useful data range, where the control data range contains control data based on the data link layer protocol, and where the useful data range contains the useful data which are to be transmitted, and
    is set up such that the information, specifying the one or more data link layer protocol buffer storages and the one or more data link layer data streams from which the data to be transmitted which are contained in the generated protocol data unit have been read is written to the control data range of the protocol data unit.

5. The data link layer protocol unit as claimed in claim 4, wherein the data link layer protocol data unit generation unit is set up such that the control data range generated is the header field of the protocol data unit.

6. The data link layer protocol unit as claimed in claim 4, wherein the data link layer protocol data unit generation unit is set up such that
    the information specifying the one or more data link layer protocol buffer storages from which the data to be transmitted which are contained in the generated protocol data unit have been read is written to the control data range of the protocol data unit, and
    the information specifying the one or more data link layer data streams from which the data to be transmitted which are contained in the generated protocol data unit have been read is written to the control data range of the protocol data unit in association with a respective one of the data link layer protocol buffer storages.

7. The data link layer protocol unit as claimed in claim 3, further comprising a medium access subcontrol unit and an automatic repeat request control unit.

8. The data link layer protocol unit as claimed in claim 7, wherein the automatic repeat request control unit is set up to perform a hybrid automatic repeat request method.

9. The data link layer protocol unit as claimed in claim 8, wherein the automatic repeat request control unit is set up to perform precisely one automatic repeat request process per data link layer protocol buffer storage.

10. The data link layer protocol unit as claimed in claim 9, set up to select a transport format for each automatic repeat request process.

11. The data link layer protocol unit as claimed in claim 9, wherein the data link layer protocol buffer storages are automatic repeat request buffer storages, with each automatic repeat request buffer storage being associated with an automatic repeat request process, and
wherein the data link layer protocol unit is set up such that the transport format(s) is/are selected based on filling levels of the automatic repeat request buffer storages.

12. The data link layer protocol unit as claimed in claim 1, set up as a medium access control unit in a medium access control unit Enhanced Uplink subprotocol layer.

13. A mobile radio device having at least one data link layer protocol unit as claimed in claim 1.

14. The mobile radio device as claimed in claim 13, comprising:
a weighting memory set up to store weighting values, with a respective weighting value being associated with one of the data link layer protocol buffer storages; and
a data link layer protocol buffer storage reading device which is set up such that it reads the data buffer stored in the data link layer protocol buffer storages from the data link layer protocol buffer storages based on the selected transport format and in an order which is indicated by the weighting values, with the weighting values being used to indicate a respective proportion of the total data transmission bandwidth available for data transmission, which proportion is respectively allocated for reading the data stored in the respective data link layer protocol buffer storage.

15. The mobile radio device as claimed in claim 14, further comprising a weighting setting unit set up to prescribe the weighting values and/or weighting value ranges based on a quality of service respectively used for the data transmission.

16. The mobile radio device as claimed in claim 15, wherein the weighting setting unit is set up such that it prescribes weighting values which are within a respective weighting value range.

17. The mobile radio device as claimed in claim 14, further comprising a transmission control device set up to control mobile radio transmission resources of the mobile radio device, which transmission control device is set up to receive the transport formats from another mobile radio device, which allows the transport formats to be prescribed by the other mobile radio device.

18. A mobile radio device, comprising:
at least one data link layer protocol unit;
a transport format memory set up to store a plurality of transport formats, with a transport format containing control parameters according td which the data are mapped from at least one logical channel onto at least one transport channel by the data link layer protocol unit in another mobile radio device, where the control parameters in at least some of the transport formats contain information specifying one or more data link layer protocol buffer storages and one or more data link layer data streams from which the data to be transmitted need to be transmitted in a data transmission time interval; and
a transport format transmission device which is set up to transmit the transport formats to the other mobile radio device.

19. The mobile radio device as claimed in claim 18, set up as a mobile radio base station.

20. A mobile radio network control unit, comprising:
a transport format memory set up to store a plurality of transport formats, with a transport format containing control parameters according to which the data are mapped from at least one logical channel onto at least one transport channel by the data link layer protocol unit in another mobile radio device, where the control parameters in at least some of the transport formats contain information specifying one or more data link layer protocol buffer storages and one or more data link layer data streams from which the data to be transmitted need to be transmitted in a data transmission time interval; and
a transport format transmission device which is set up to transmit the transport formats to the other mobile radio device.

21. A method for reading data from a plurality of data link layer protocol buffer storages which are associated with at least one data link layer protocol unit, performed in a mobile radio device, the method comprising selecting a transport format from a plurality of stored transport formats, with a transport format containing control parameters according to which the data are mapped from at least one logical channel onto at least one transport channel by the data link layer protocol unit, where the control parameters in at least some of the transport formats contain information specifying the one or more data link layer protocol buffer storages and one or more data link layer data streams from which the data to be transmitted need to be transmitted in a data transmission time interval, wherein the data buffer stored in the data link layer protocol buffer storages are read based on the control parameters.

22. A data link layer protocol unit in a mobile radio device for mapping data which are to be transmitted using the mobile radio device from at least one logical channel onto at least one transport channel, comprising:
a plurality of data link layer protocol buffer storage means set up to buffer store logical channel data which are to be transmitted from one or more data link layer data streams of the logical channel data;
at least one transport format memory means for storing a plurality of transport formats, with each transport format containing control parameters according to which the data are mapped from the at least one logical channel onto the at least one transport channel by the data link layer protocol unit, where the control parameters in at least some of the transport formats contain information specifying the one or more data link layer protocol buffer storage means and the one or more data link layer data streams from which the data to be transmitted need to be transmitted in a data transmission time interval;
at least one transport format selection means for selecting from the plurality of stored transport formats a respective transport format to be used; and a data link layer protocol buffer storage reading means for reading the data buffer stored in the data link layer protocol buffer storage means based on the selected transport format.

23. The method as claimed in claim 21, further comprising:
generating a protocol data unit which has a control data range and a useful data range, wherein the control data range comprises control data based on the data link layer protocol, and wherein the useful data range comprises the useful data which are to be transmitted; and
writing the information, specifying the one or more data link layer protocol buffer storages and the one or more data link layer data streams from which the data to be transmitted which are comprised in the generated protocol data unit have been read, to the control data range of the protocol data unit.

24. The method as claimed in claim 23, wherein the control data range generated is the header field of the protocol data unit.

25. The method as claimed in claim 23, further comprising:
writing the information, specifying the one or more data link layer protocol buffer storages from which the data to be transmitted which are comprised in the generated protocol data unit have been read, to the control data range of the protocol data unit; and
writing the information, specifying the one or more data link layer data streams from which the data to be transmitted which are contained in the generated protocol data unit have been read, to the control data range of the protocol data unit in association with a respective one of the data link layer protocol buffer storages.

26. The mobile radio device as claimed in claim 13, comprising:
a weighting memory set up to store weighting value ranges, with a respective weighting value range being associated with one of the data link layer protocol buffer storages; and
a data link layer protocol buffer storage reading device which is set up such that it reads the data buffer stored in the data link layer protocol buffer storages from the data link layer protocol buffer storages based on the selected transport format and in an order which is indicated by the weighting value ranges, with the weighting value ranges being used to indicate a respective proportion of the total data transmission bandwidth available for data transmission, which proportion is respectively allocated for reading the data stored in the respective data link layer protocol buffer storage.

* * * * *

UNITED STATES PATENT AND TRADEMARK OFFICE
CERTIFICATE OF CORRECTION

PATENT NO. : 7,839,892 B2  Page 1 of 1
APPLICATION NO. : 11/238645
DATED : November 23, 2010
INVENTOR(S) : Michael Eckert et al.

It is certified that error appears in the above-identified patent and that said Letters Patent is hereby corrected as shown below:

In the Claims:

At column 31, line 65, in Claim 18, delete "td" and insert -- to --, therefor.

Signed and Sealed this
Fifteenth Day of March, 2011

David J. Kappos
*Director of the United States Patent and Trademark Office*